(12) United States Patent
Bolster et al.

(10) Patent No.: US 12,298,583 B2
(45) Date of Patent: May 13, 2025

(54) OPTICAL PANEL ARRANGEMENTS AND MODULES THEREFORE

(71) Applicant: COMMSCOPE TECHNOLOGIES LLC, Hickory, NC (US)

(72) Inventors: Kristofer Bolster, Jordan, MN (US); John T. Pfarr, Le Sueur, MN (US); Matthew J. Holmberg, Carver, MN (US); Jill Anne Malecha, Bloomington, MN (US); Jon Bradley Collins, Maple Grove, MN (US)

(73) Assignee: CommScope Technologies LLC, Claremont, NC (US)

( * ) Notice: Subject to any disclaimer, the term of this patent is extended or adjusted under 35 U.S.C. 154(b) by 313 days.

(21) Appl. No.: 17/765,140

(22) PCT Filed: Sep. 30, 2020

(86) PCT No.: PCT/US2020/053450
§ 371 (c)(1),
(2) Date: Mar. 30, 2022

(87) PCT Pub. No.: WO2021/067381
PCT Pub. Date: Apr. 8, 2021

(65) Prior Publication Data
US 2022/0357541 A1 Nov. 10, 2022

Related U.S. Application Data

(60) Provisional application No. 62/908,276, filed on Sep. 30, 2019.

(51) Int. Cl.
*G02B 6/00* (2006.01)
*G02B 6/44* (2006.01)

(52) U.S. Cl.
CPC ......... *G02B 6/4453* (2013.01); *G02B 6/4452* (2013.01)

(58) Field of Classification Search
CPC ....... G02B 6/4453; G02B 6/4452; G02B 6/00
See application file for complete search history.

(56) References Cited

U.S. PATENT DOCUMENTS 8,452,148 B2 * 5/2013 Cooke .................. G02B 6/4453
385/135
9,020,320 B2 4/2015 Cooke et al.
(Continued)

FOREIGN PATENT DOCUMENTS

| WO | 2010/001155 A2 | 1/2010 |
| WO | 2014/088981 A1 | 6/2014 |

OTHER PUBLICATIONS

International Search Report and Written Opinion of the International Searching Authority for International Patent Application No. PCT/US2020/053450 mailed Mar. 19, 2021, 12 pages.
(Continued)

*Primary Examiner* — Jennifer Doan
(74) *Attorney, Agent, or Firm* — Merchant & Gould P.C.

(57) ABSTRACT

A panel arrangement provides at least 288 output fiber connections within 1 rack unit (RU). The panel arrangement includes modules mounted within a chassis. Each module carries a plurality of optical adapters, which each define multiple de-mateable connection interface locations. In certain examples, each connection interface location enables a connection between multiple pairs of optical fibers. A WDM or other optical circuitry may be provided within the module to optically couple an input connection interface location to output connection interface locations.

13 Claims, 33 Drawing Sheets

(56) References Cited

U.S. PATENT DOCUMENTS

| | | | |
|---|---|---|---|
| 9,279,951 B2 | 3/2016 | McGranahan et al. | |
| 10,018,787 B1 * | 7/2018 | Wang | G02B 6/3845 |
| 10,613,286 B2 | 4/2020 | Courchaine et al. | |
| 10,721,000 B2 * | 7/2020 | Masarik | G02B 6/4204 |
| 10,969,554 B2 | 4/2021 | Guzzo | |
| 11,048,055 B2 | 6/2021 | Berridge et al. | |
| 11,435,542 B2 | 9/2022 | Pilon | |
| 2006/0051044 A1 | 3/2006 | Swam et al. | |
| 2006/0193590 A1 | 8/2006 | Puetz et al. | |
| 2008/0219634 A1 | 9/2008 | Rapp et al. | |
| 2011/0317971 A1 | 12/2011 | Zhang et al. | |
| 2013/0129299 A1 | 5/2013 | Zimmel | |
| 2015/0060539 A1 | 3/2015 | Thompson | |
| 2019/0064452 A1 | 2/2019 | Zseng | |
| 2019/0162923 A1 | 5/2019 | Li et al. | |
| 2021/0080671 A1 | 3/2021 | Bell et al. | |
| 2022/0236510 A1 | 7/2022 | Guzzo | |

OTHER PUBLICATIONS

Extended European Search Report for Application No. 20873079.6 mailed Oct. 2, 2023.

* cited by examiner

OPTICAL PANEL ARRANGEMENTS AND MODULES THEREFORE

CROSS-REFERENCE TO RELATED APPLICATION

This application is a National Stage Application of PCT/US2020/053450, filed on Sep. 30, 2020, which claims the benefit of U.S. Patent Application Ser. No. 62/908,276, filed on Sep. 30, 2019, the disclosures of which are incorporated herein by reference in their entireties. To the extent appropriate, a claim of priority is made to each of the above disclosed application.

BACKGROUND

Demand for greater telecommunication services has prompted the increase in circuit densities of termination panels. Notwithstanding the advances made in the art, there is a continuous need for further advances to improve upon high-density termination panels and associated methods. Improvements are needed, for example, to enhance termination access and cable management associated with installation, maintenance, repair, upgrade, and cross-connection procedures related to termination panels.

SUMMARY

Some aspects of the disclosure are directed to optical module configured to connect an input de-mateable connection interface location (e.g., an input port) to a plurality of output de-mateable connection interface locations (e.g., output ports). Optical circuitry may be disposed within the module to optically couple the input and output connection interface locations. For example, a wave division multiplexer (WDM) may split optical signals received at the input onto the outputs by wavelength.

In certain implementations, the input and output de-mateable connection interface locations are provided by optical adapters carried by the modules. In certain examples, each optical adapter defines multiple de-mateable connection interface locations. In certain examples, each de-mateable connection interface locations provides a fiber connection for multiple fibers (e.g., two fibers, four fibers, eight fibers, twelve fibers, twenty-four fibers). In certain implementations, the output de-mateable connection interface locations of each optical adapter provides eight fiber connections. In certain implementations, the output de-mateable connection interface locations of each module provides forty-eight output fiber connections.

In some implementations, the optical adapters are disposed in a row on the module. In other implementations, the optical adapters are grouped in multiple rows or columns. In some implementations, each of the optical adapters of a module have a common orientation. In other implementations, at least one optical adapter of a module has a different orientation from another optical adapter of the module.

One or more modules may be installed at a chassis to form a panel arrangement. In certain implementations, each module may be separately installed and/or removed from the chassis. In some implementations, a panel holds at least six modules. In other implementations, the panel holds at least eight modules.

In certain implementations, a panel arrangement provides at least 288 output fiber connections within 1 rack unit (RU) for a 19 inch rack. In certain implementations, a panel arrangement provides at least 384 output fiber connections within 1 RU for a 19 inch rack. In certain implementations, a panel arrangement provides at least 576 output fiber connections within 2 RU for a 19 inch rack. In certain implementations, two panel arrangements may be mounted in opposite directions and connected by a trough to provide at least 576 output fiber connections within 1 RU for a 19 inch rack.

In certain implementations, a panel arrangement provides at least 336 fiber connections (e.g., input fiber connections, output fiber connections, monitoring connections, etc.) within 1 RU for a 19 inch rack. In certain implementations, a panel arrangement provides at least 448 fiber connections within 1 RU for a 19 inch rack. In certain implementations, a panel arrangement provides at least 672 fiber connections within 2 RU for a 19 inch rack. In certain implementations, two panel arrangements may be mounted in opposite directions and connected by a trough to provide at least 672 fiber connections within 1 RU for a 19 inch rack.

In some implementations, the modules are mounted so that the optical adapters are accessible through an open front of the chassis. In other implementations, the modules are mounted so that the optical adapters are only accessible after being removed from the chassis.

In certain implementations, a routing guide can be disposed beneath some of the modules to aid in routing cables from the optical adapters to one or both opposite sides of the panel. In some examples, the routing guide is separate from the chassis. In other examples, the routing guide is integral with the chassis.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

3

Figure 10:
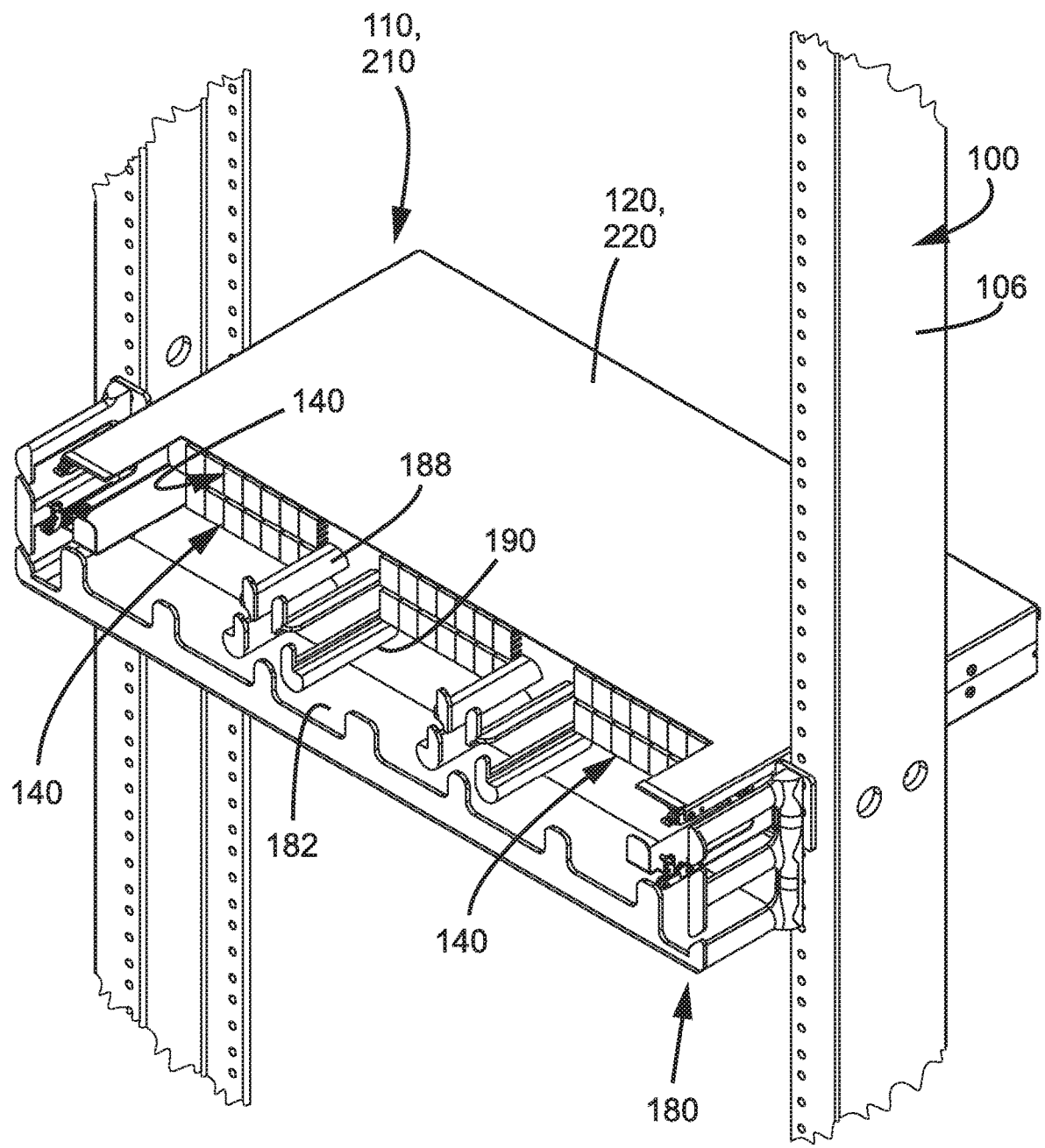
Figure 11:
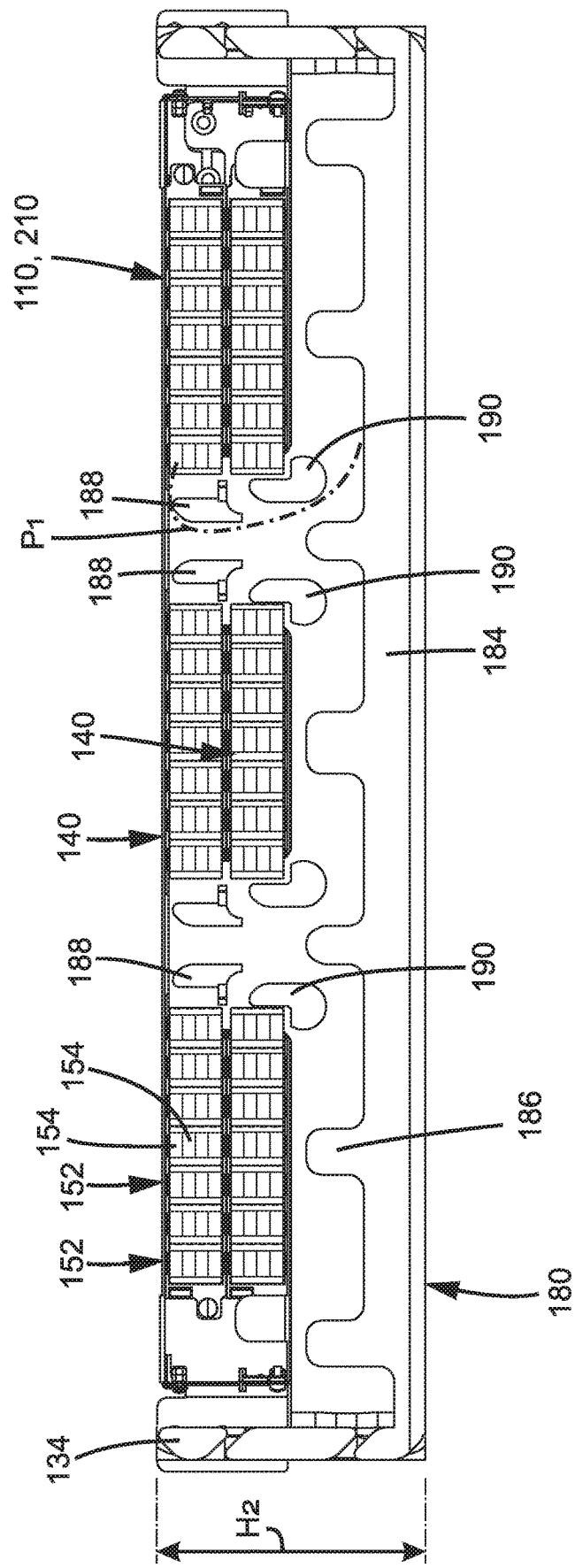
Figure 12:
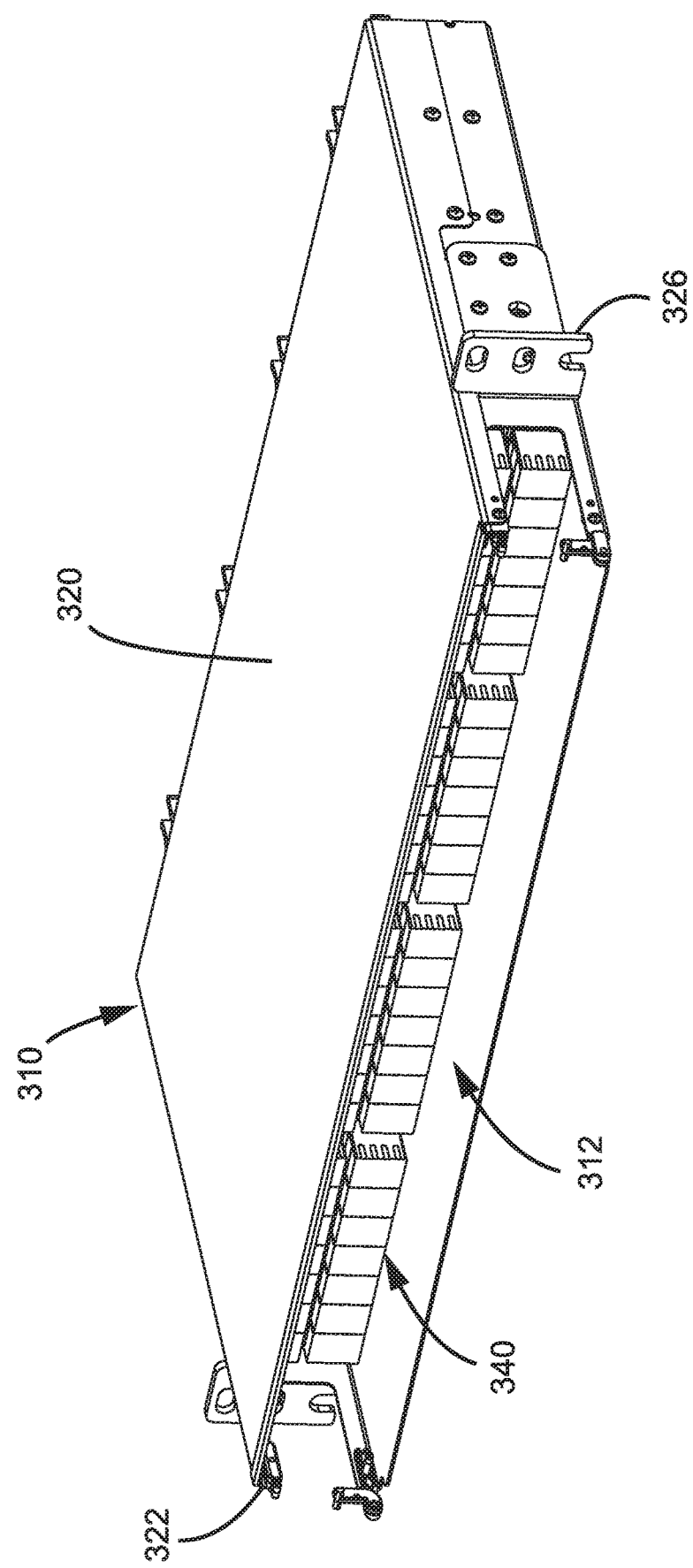
Figure 13:
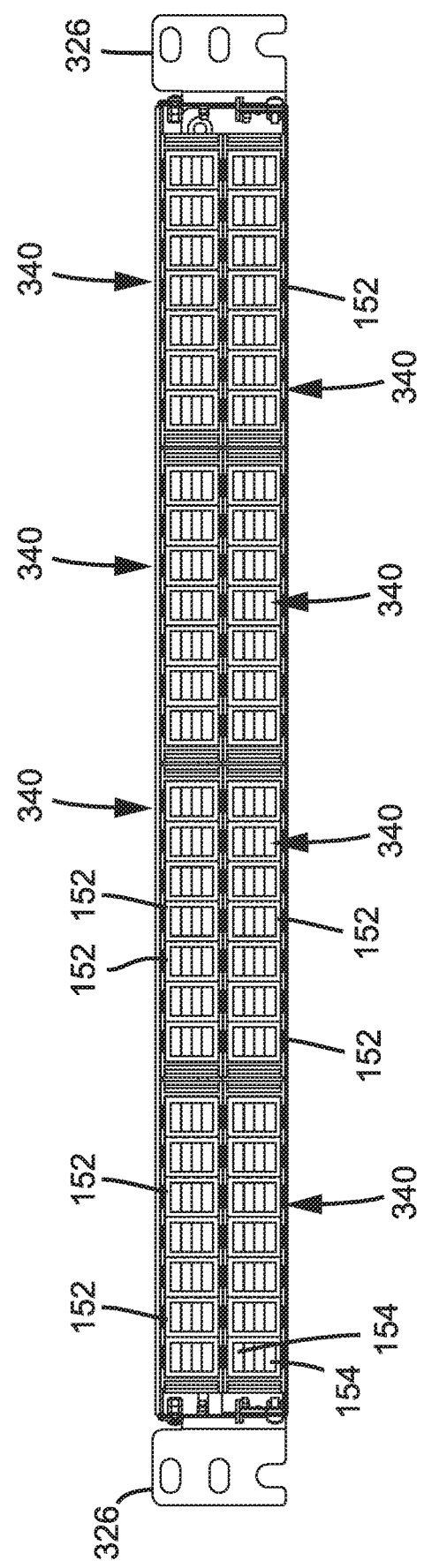
Figure 14:
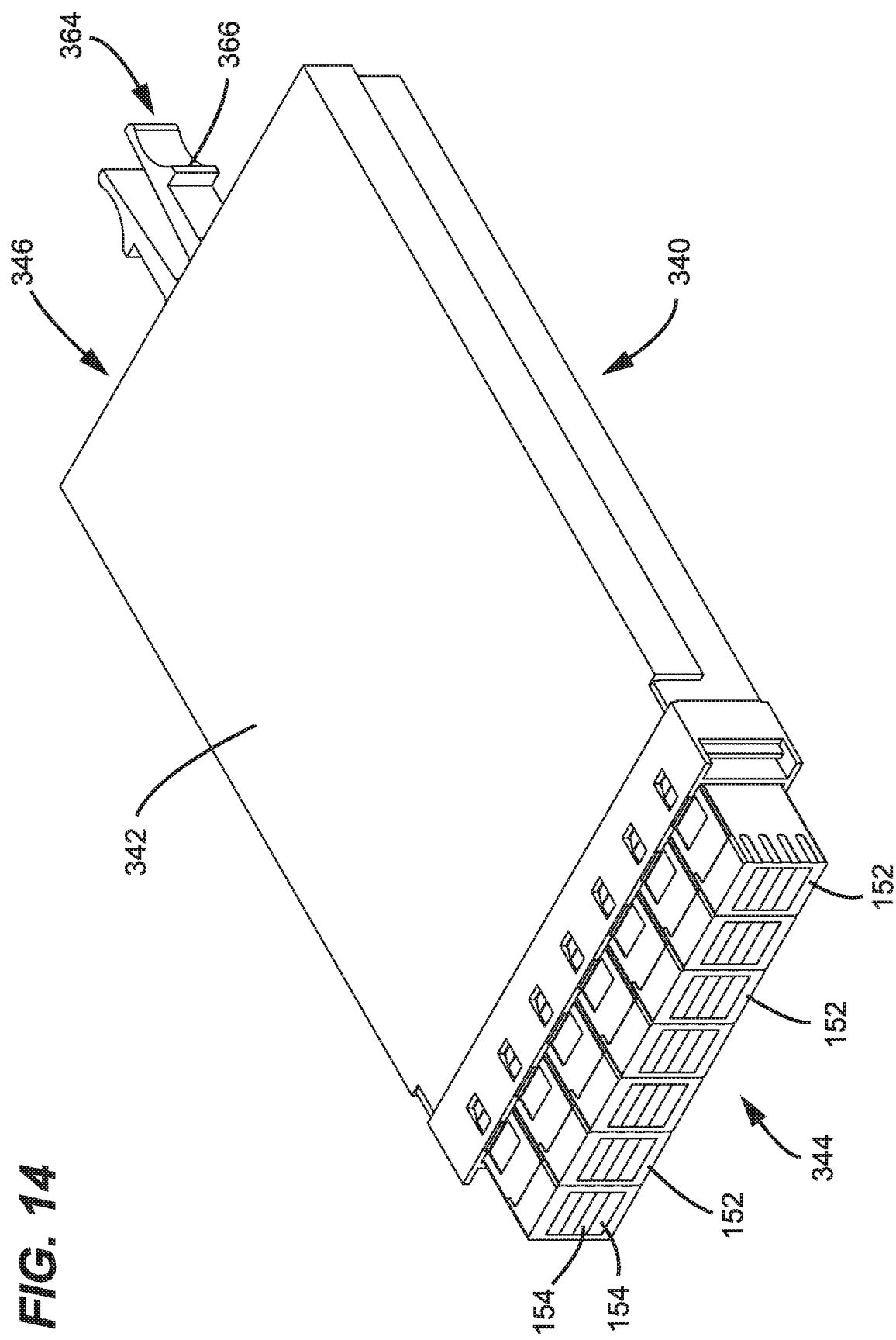
Figure 15:
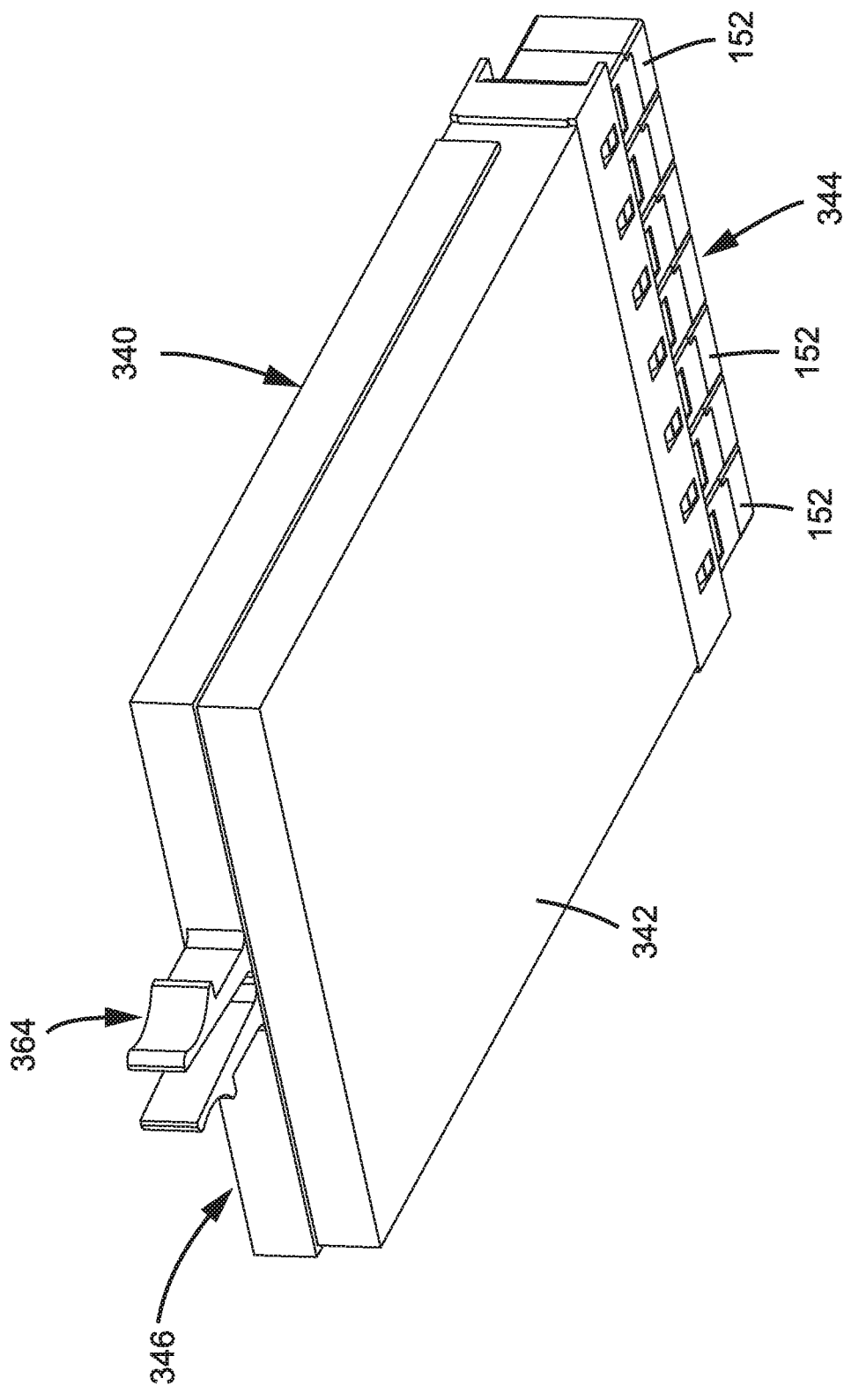
Figure 16:
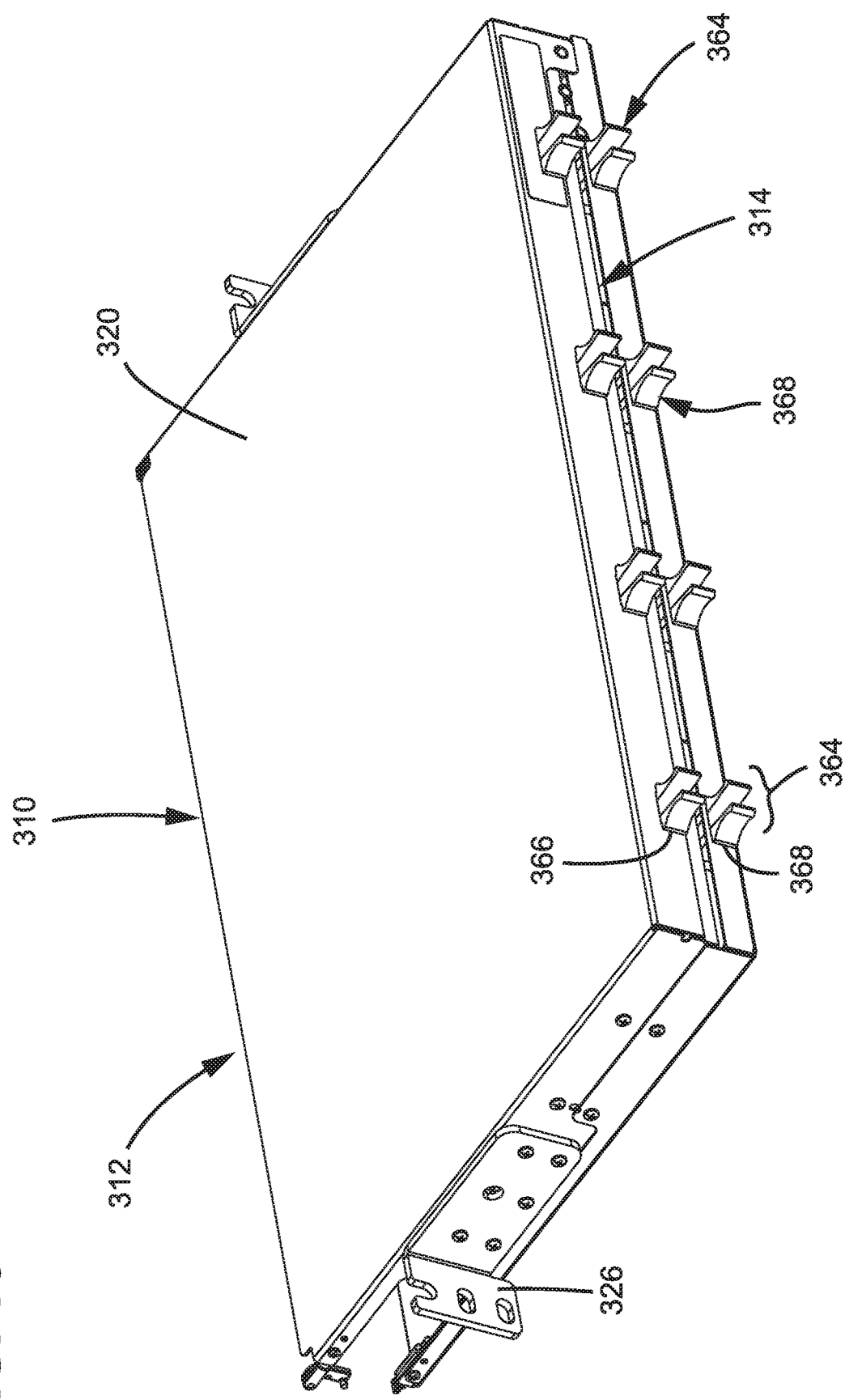
Figure 17:
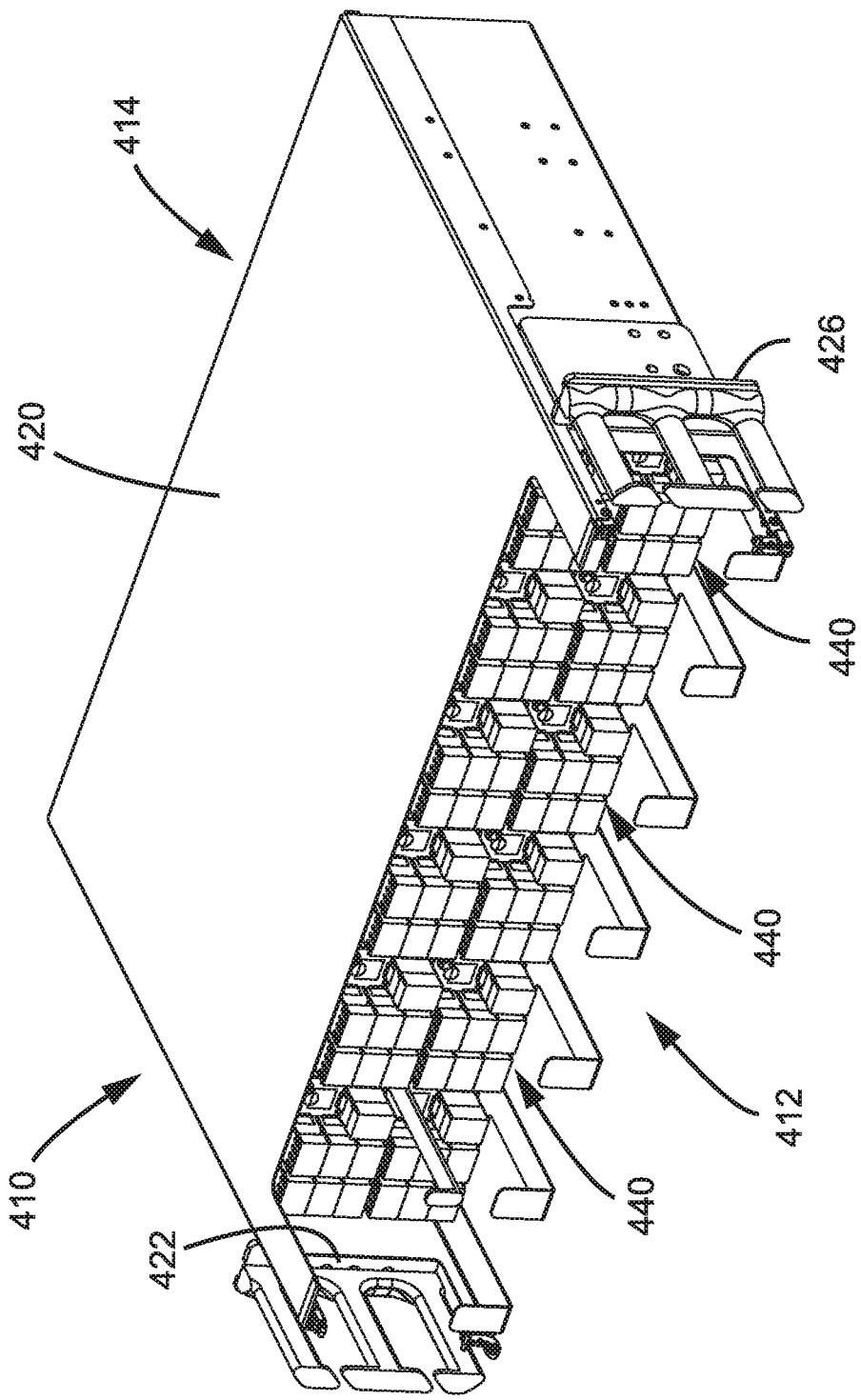
Figure 18:
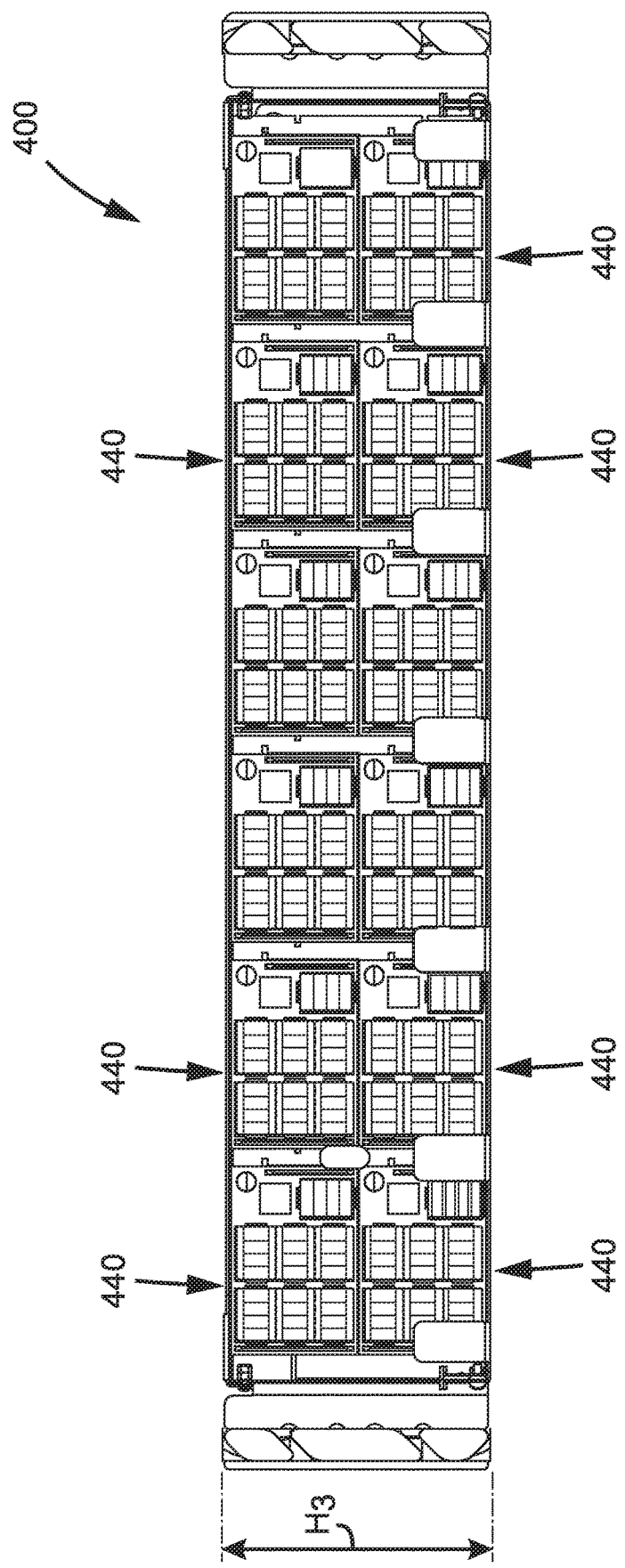
Figure 19:
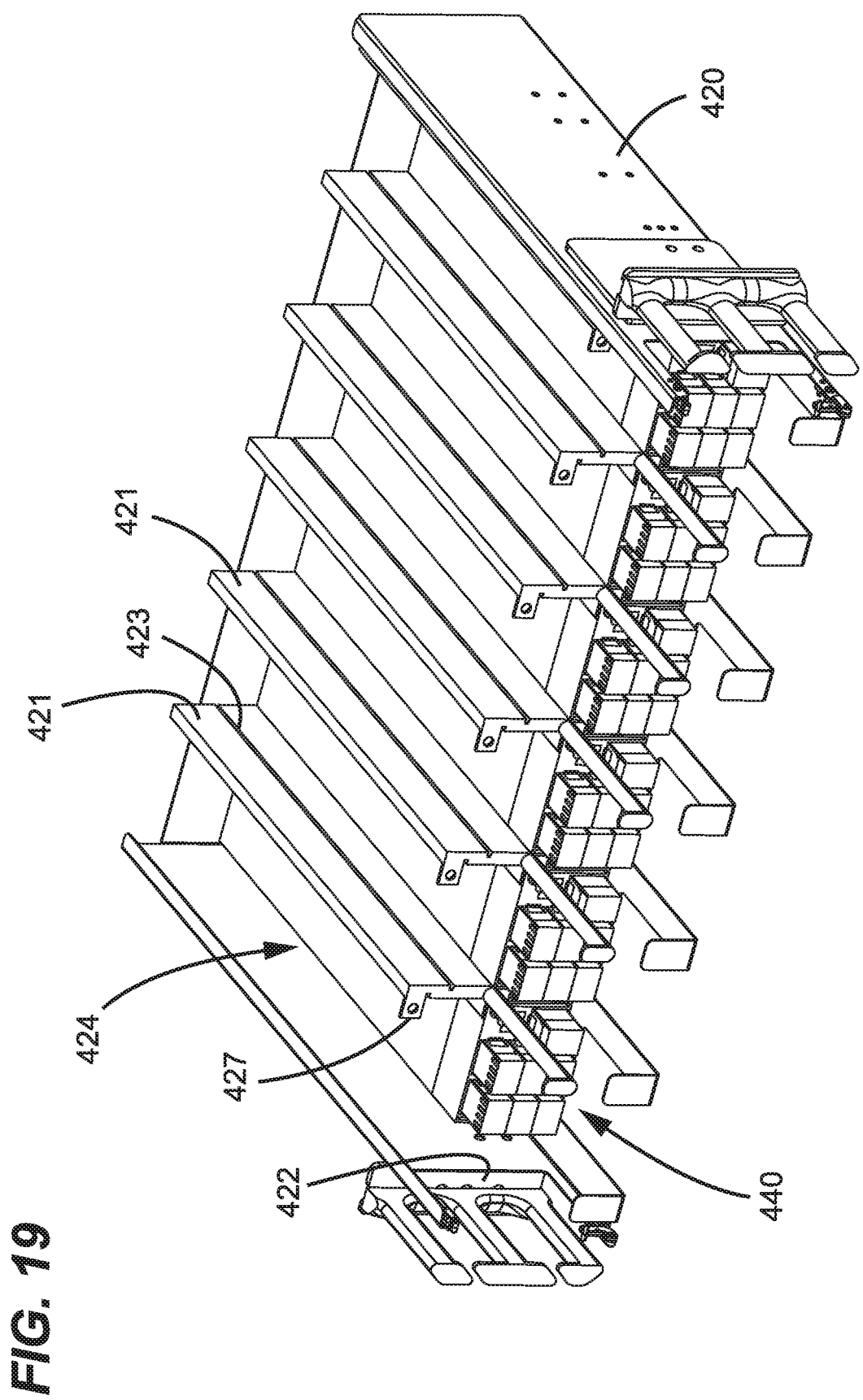
Figure 20:
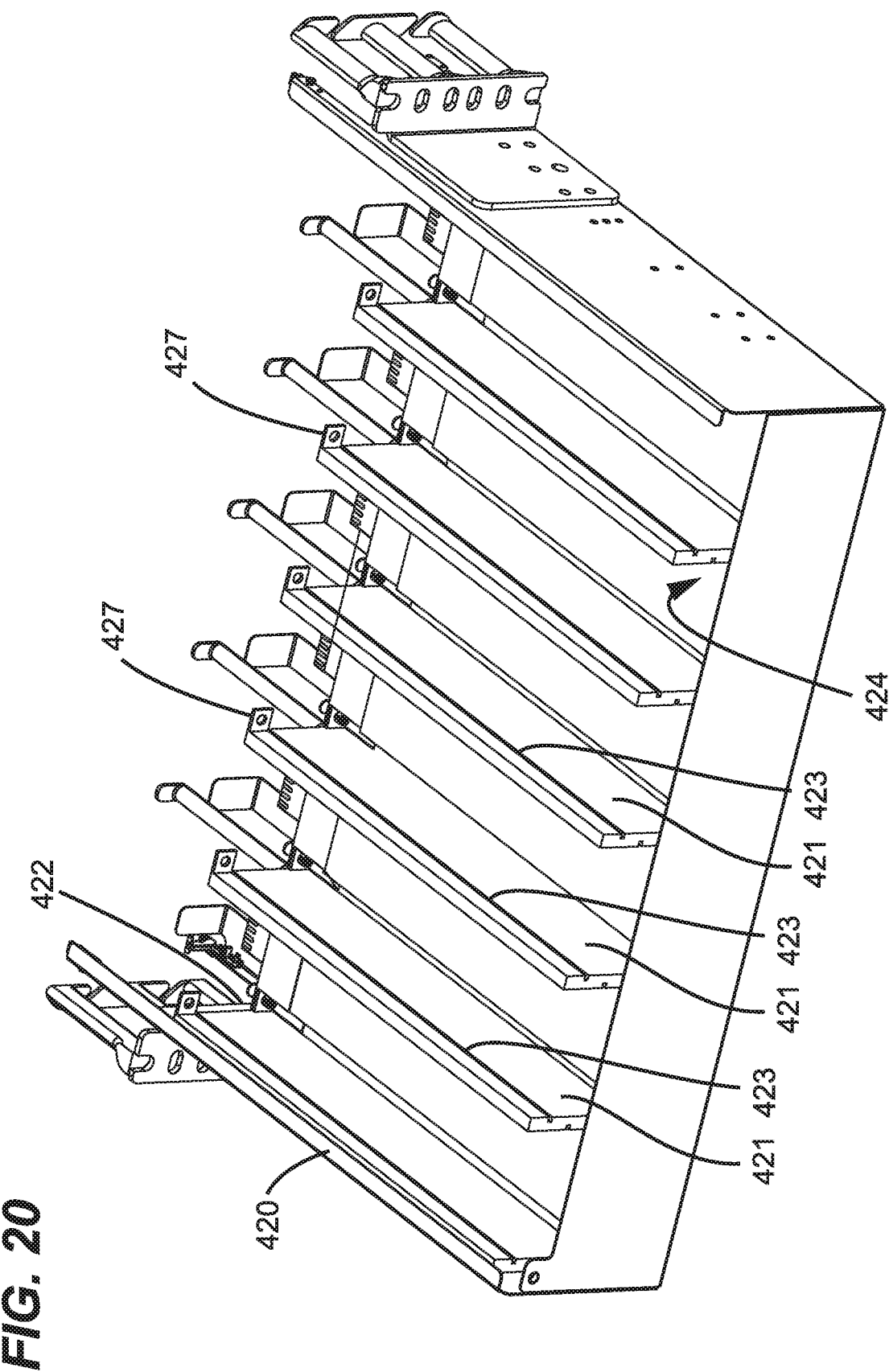
Figure 21:
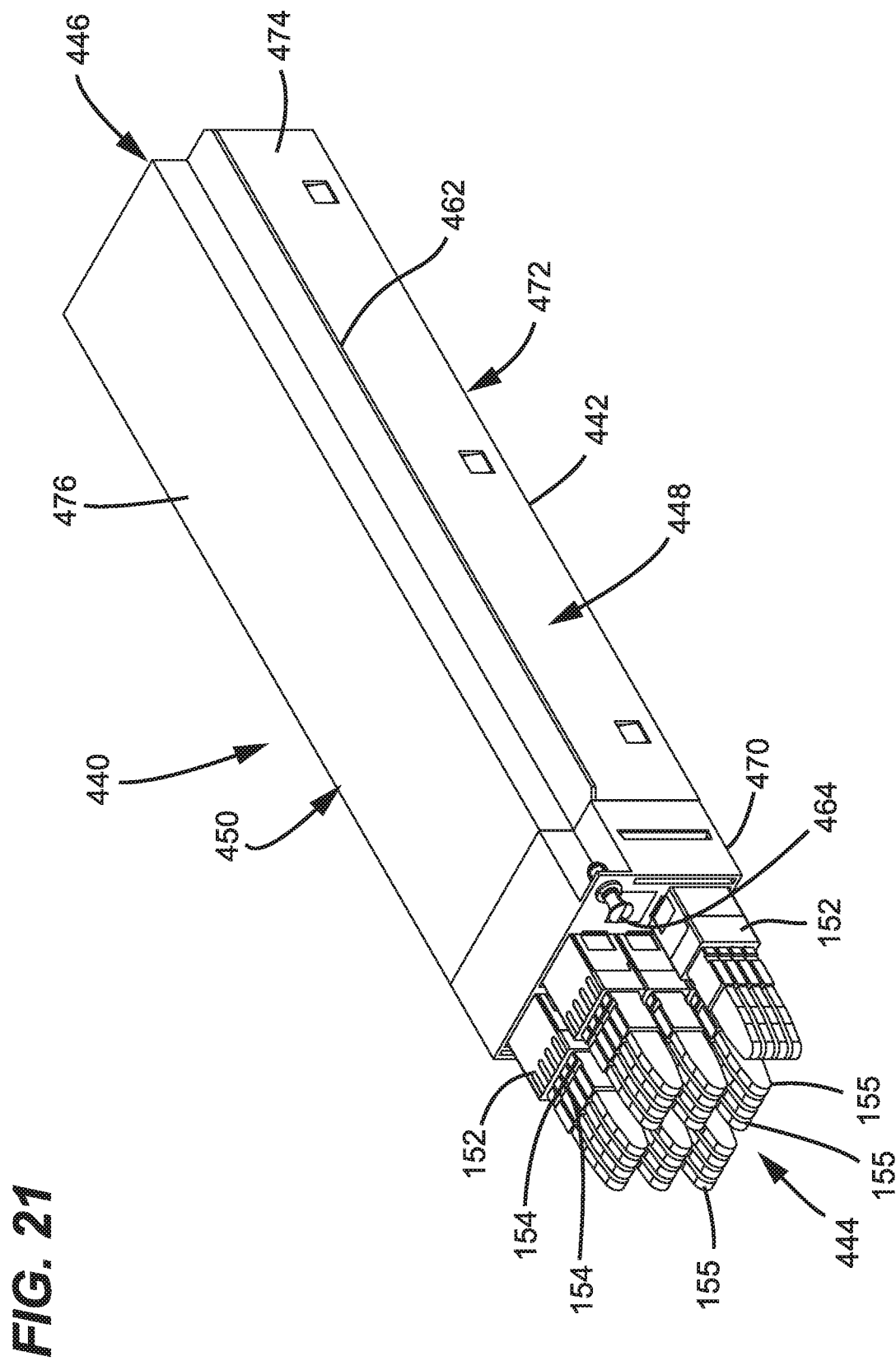
Figure 22:
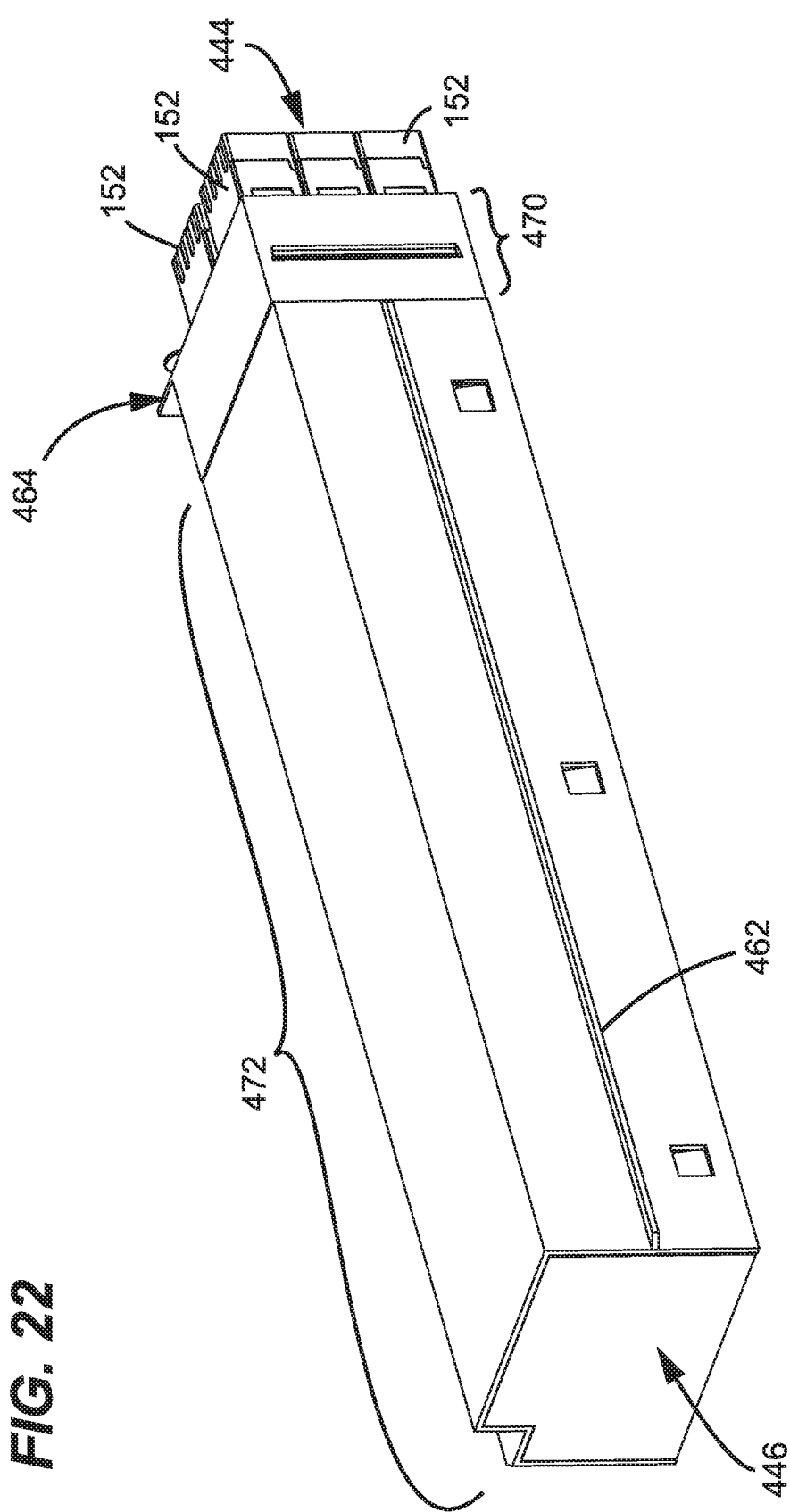
Figure 23:
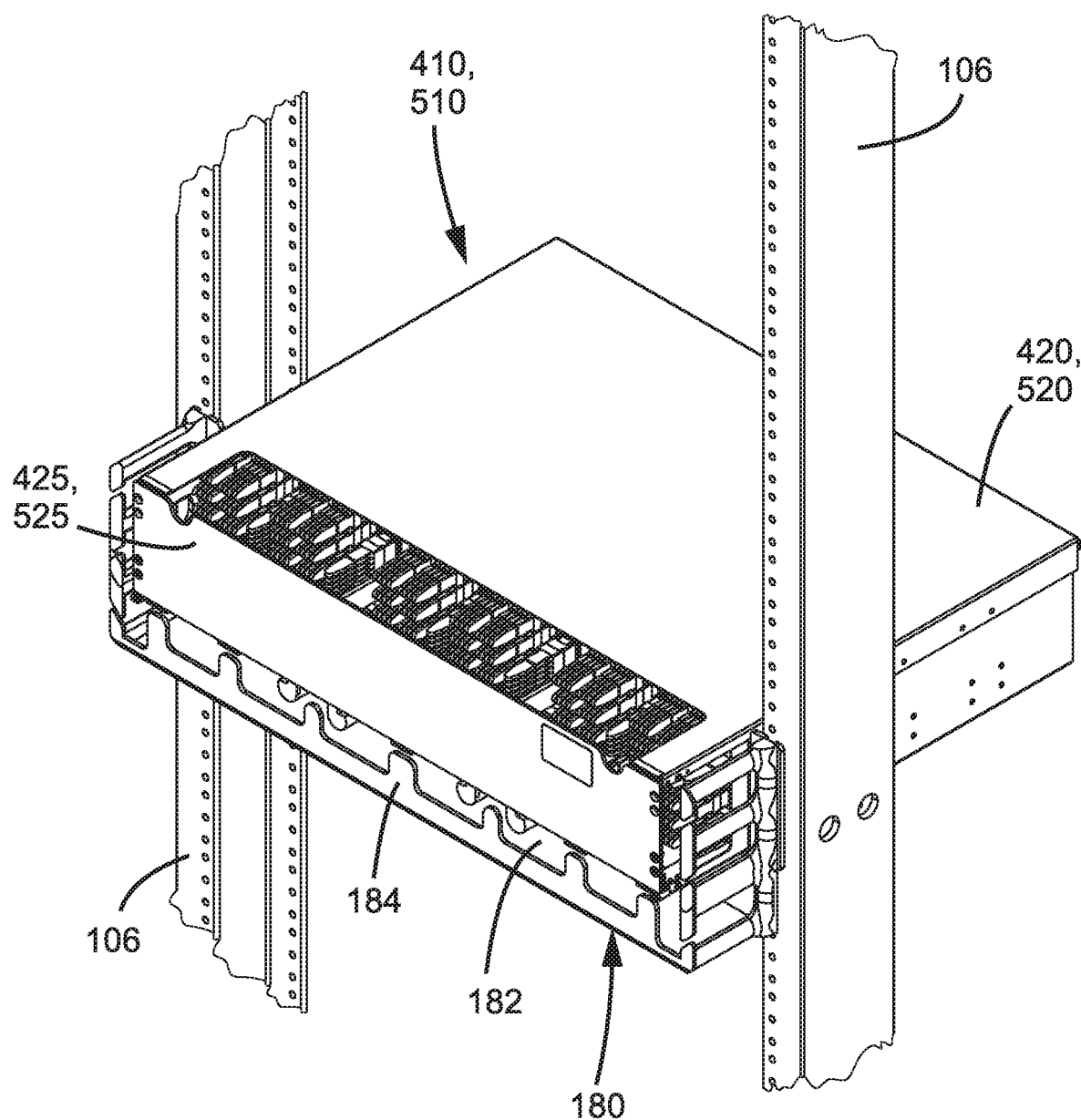
Figure 24:
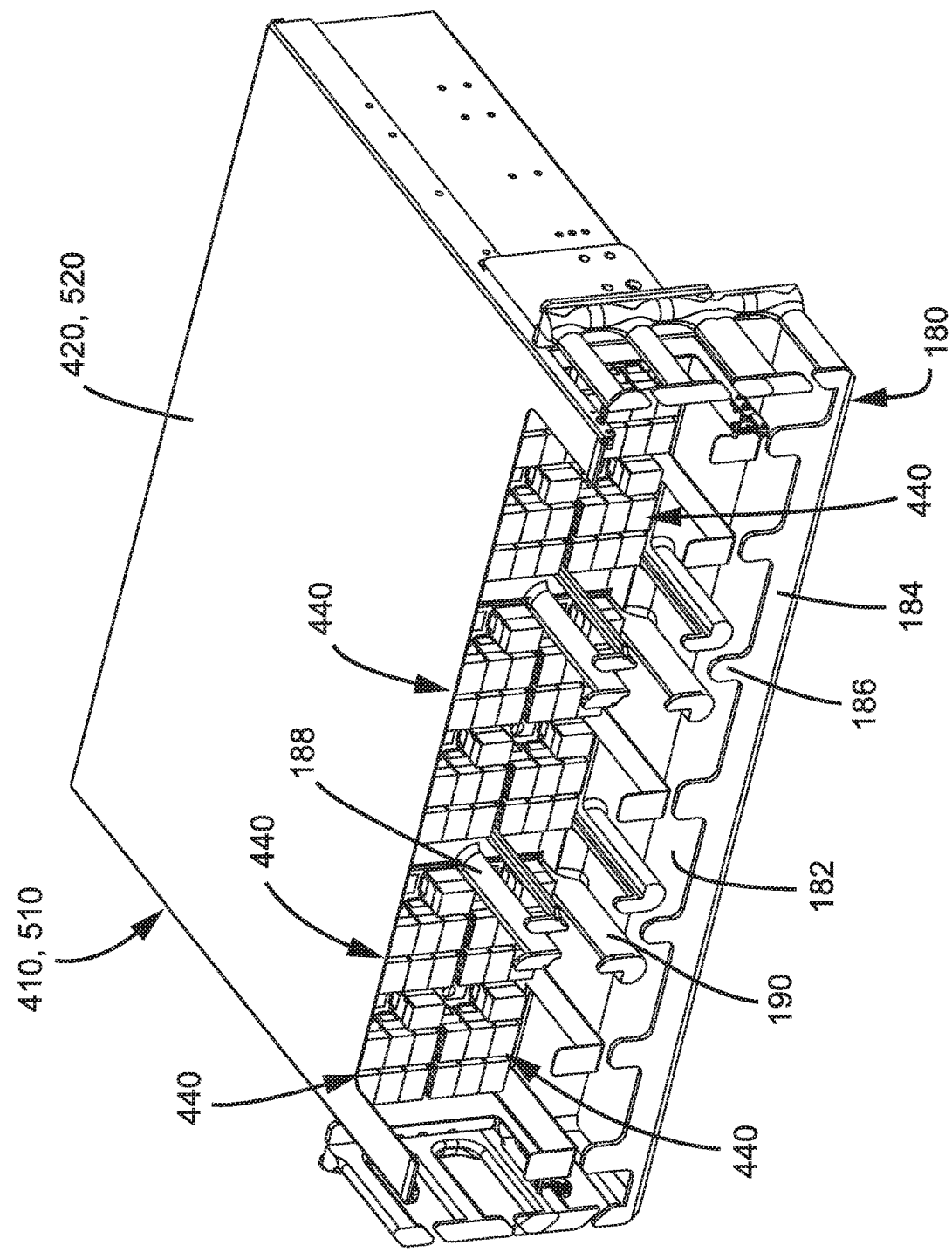
Figure 25:
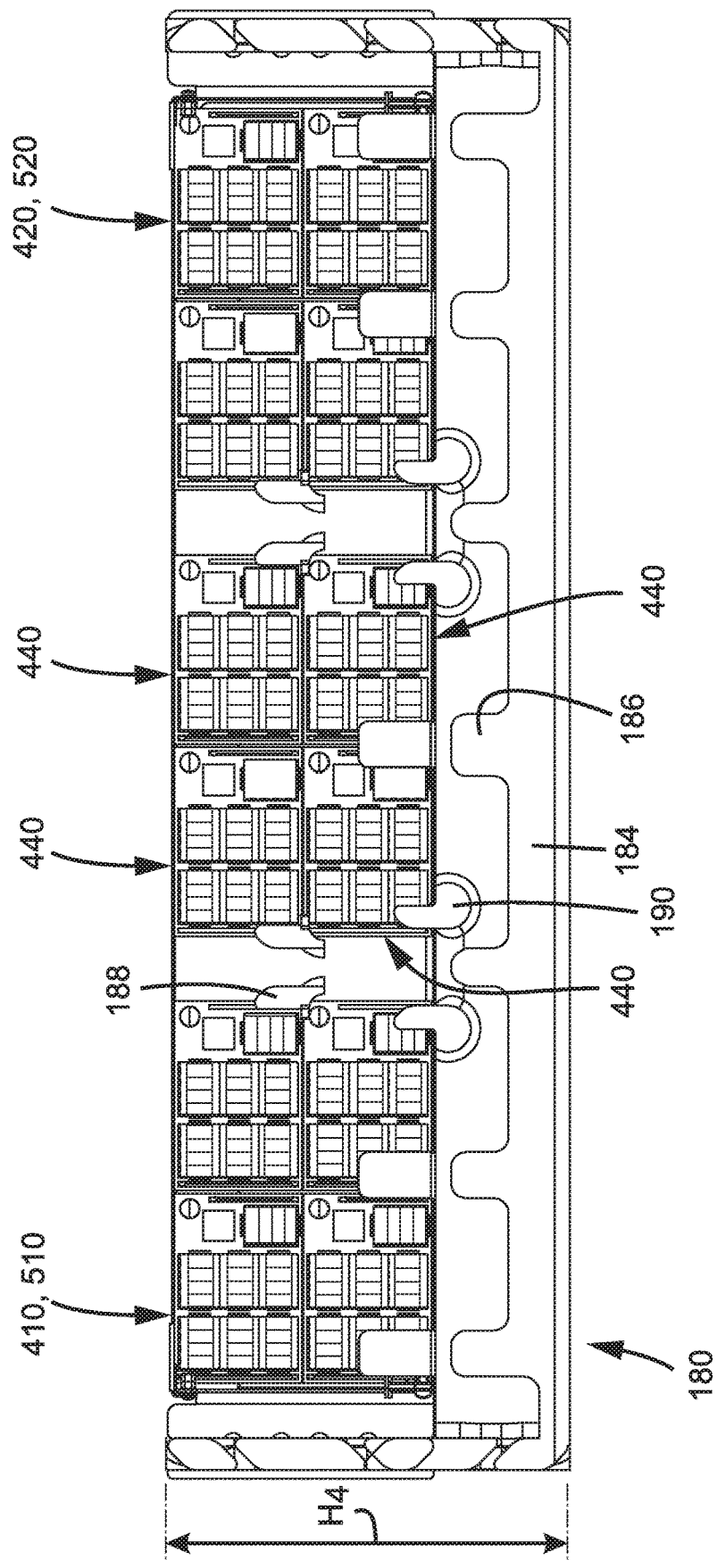
Figure 26:
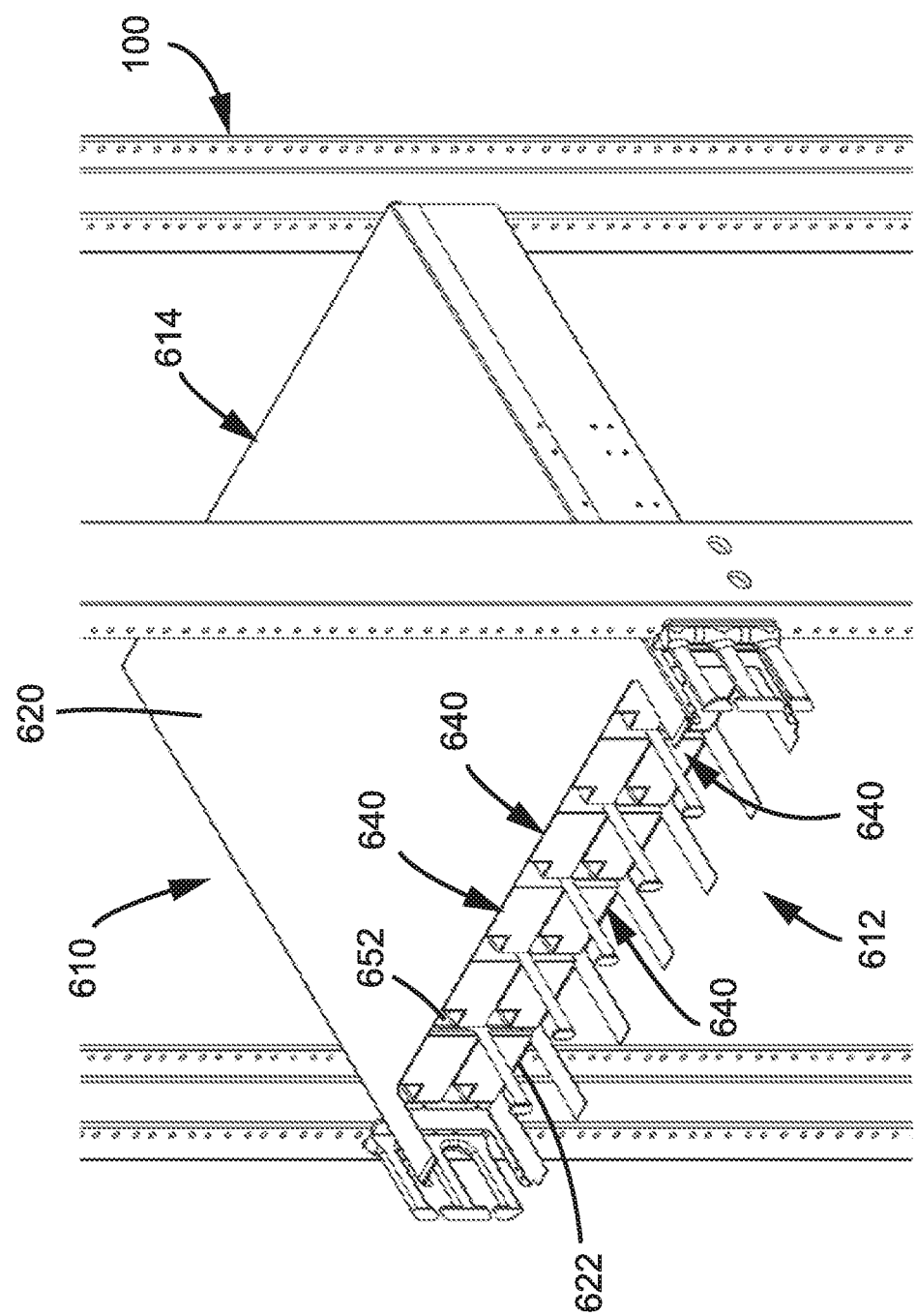
Figure 27:
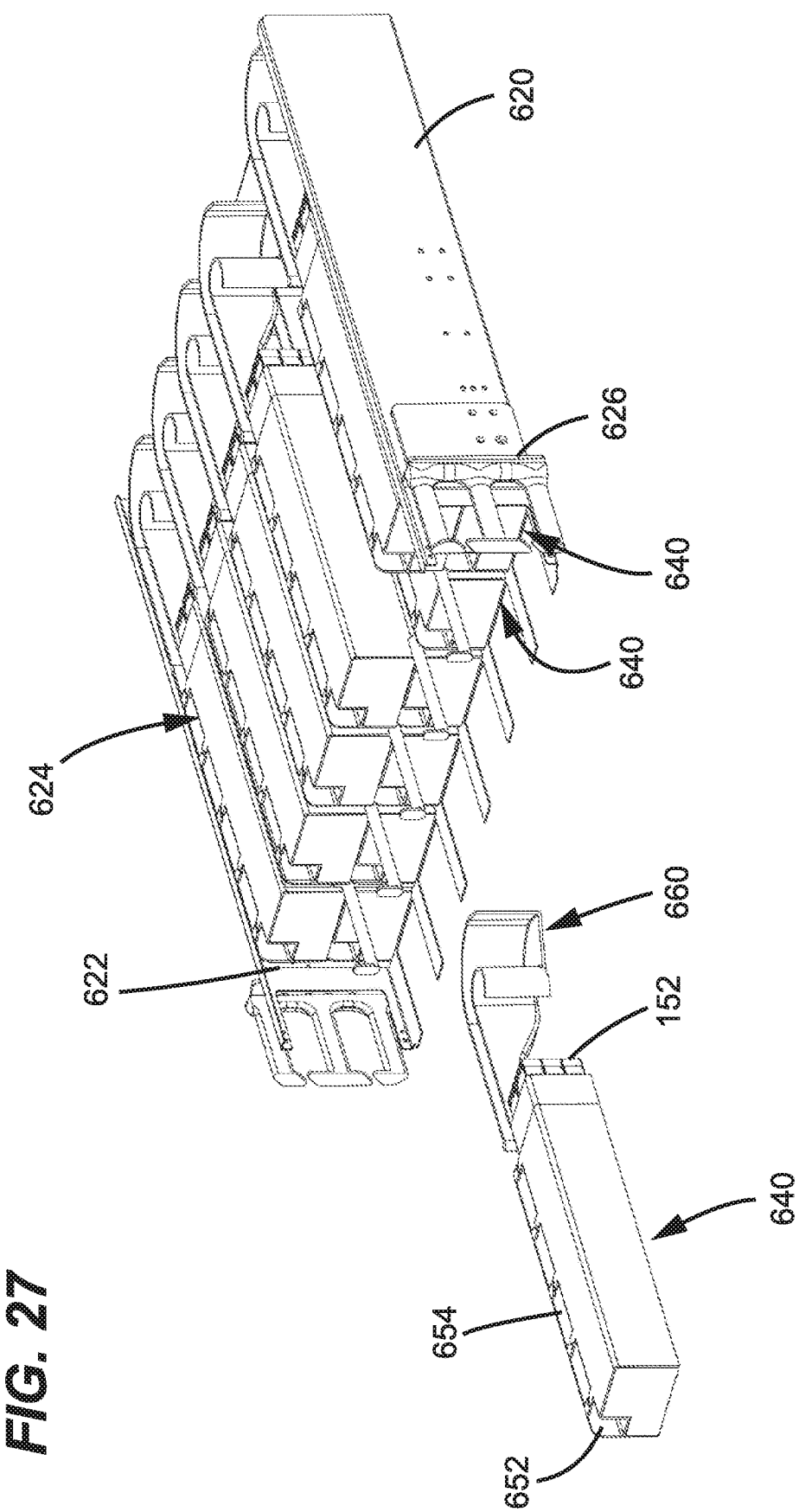
Figure 28:
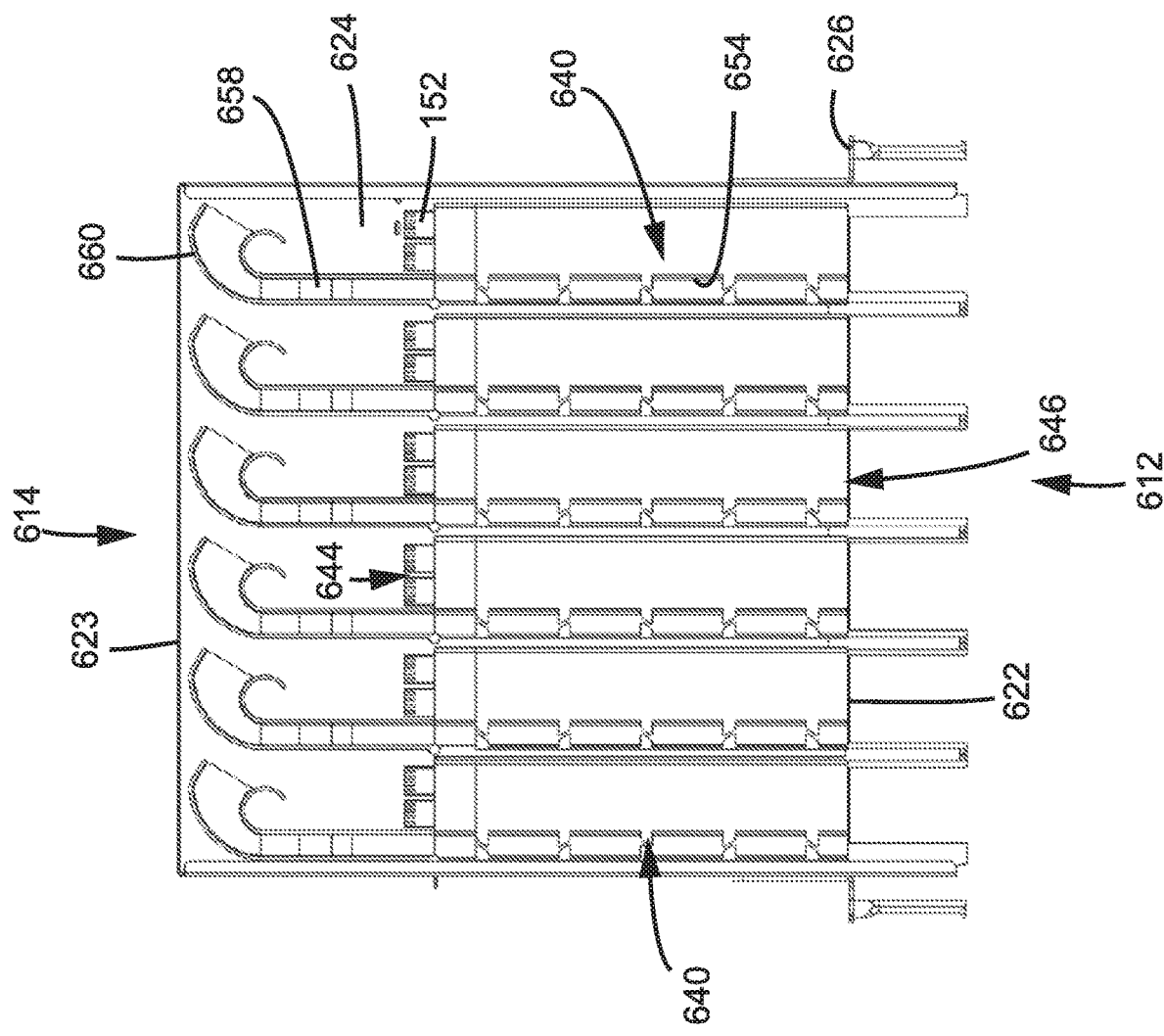
Figure 29:
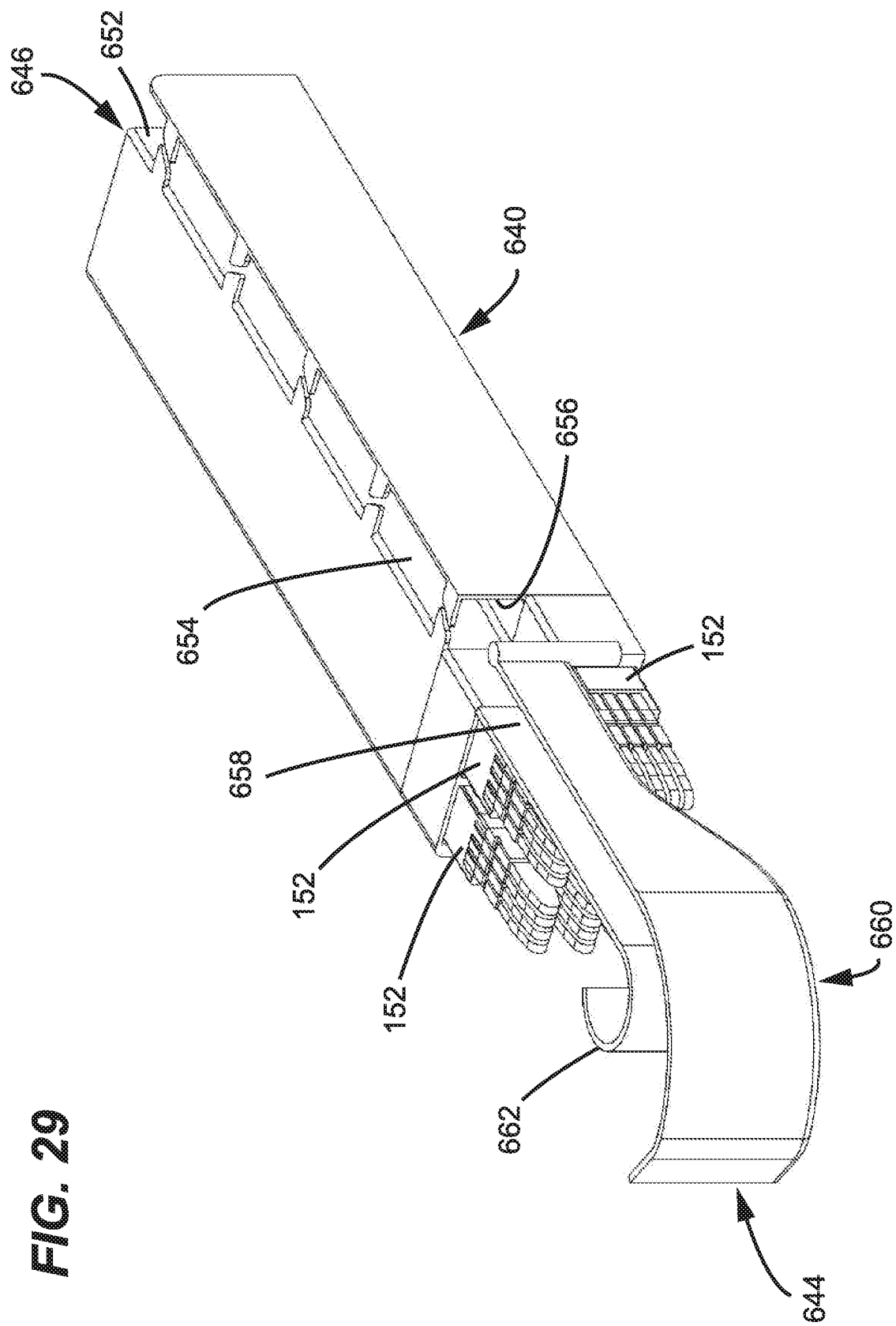
Figure 30:
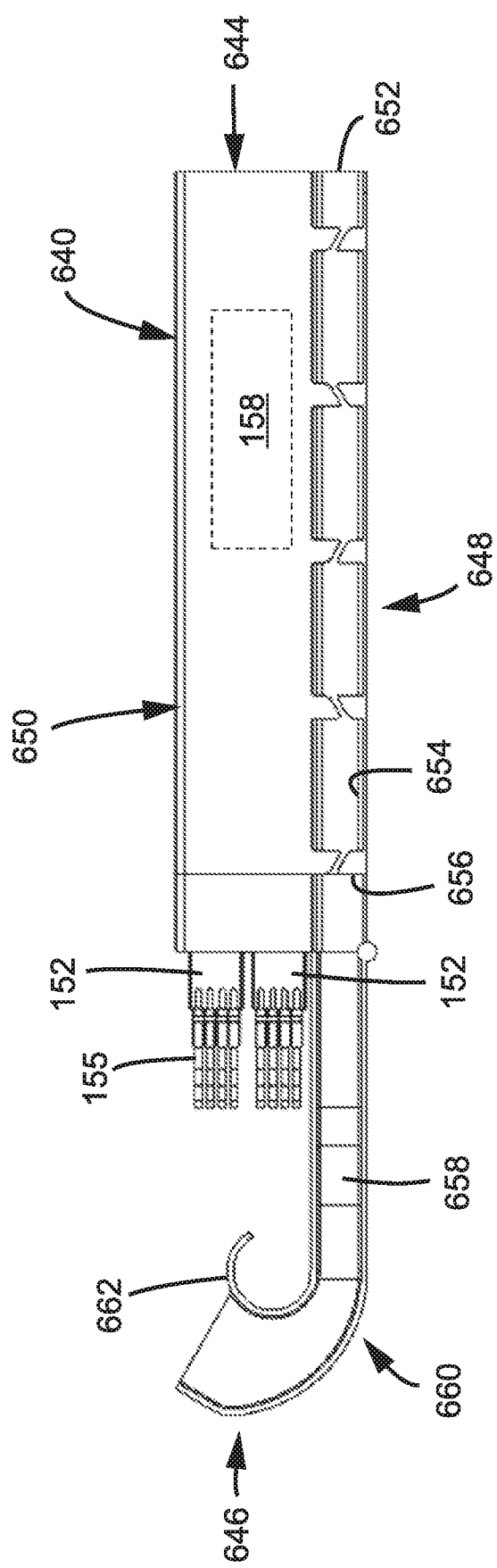
Figure 31:
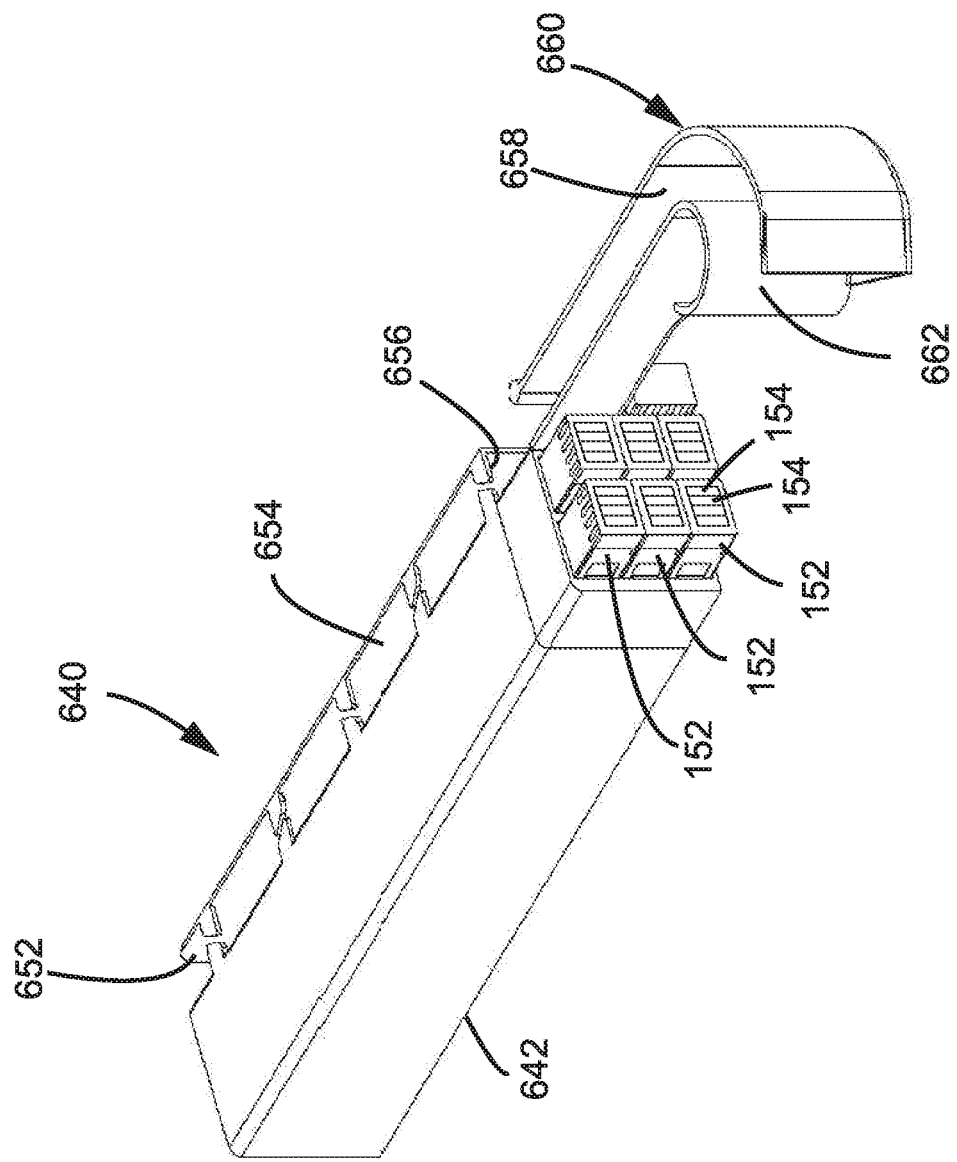
Figure 32:
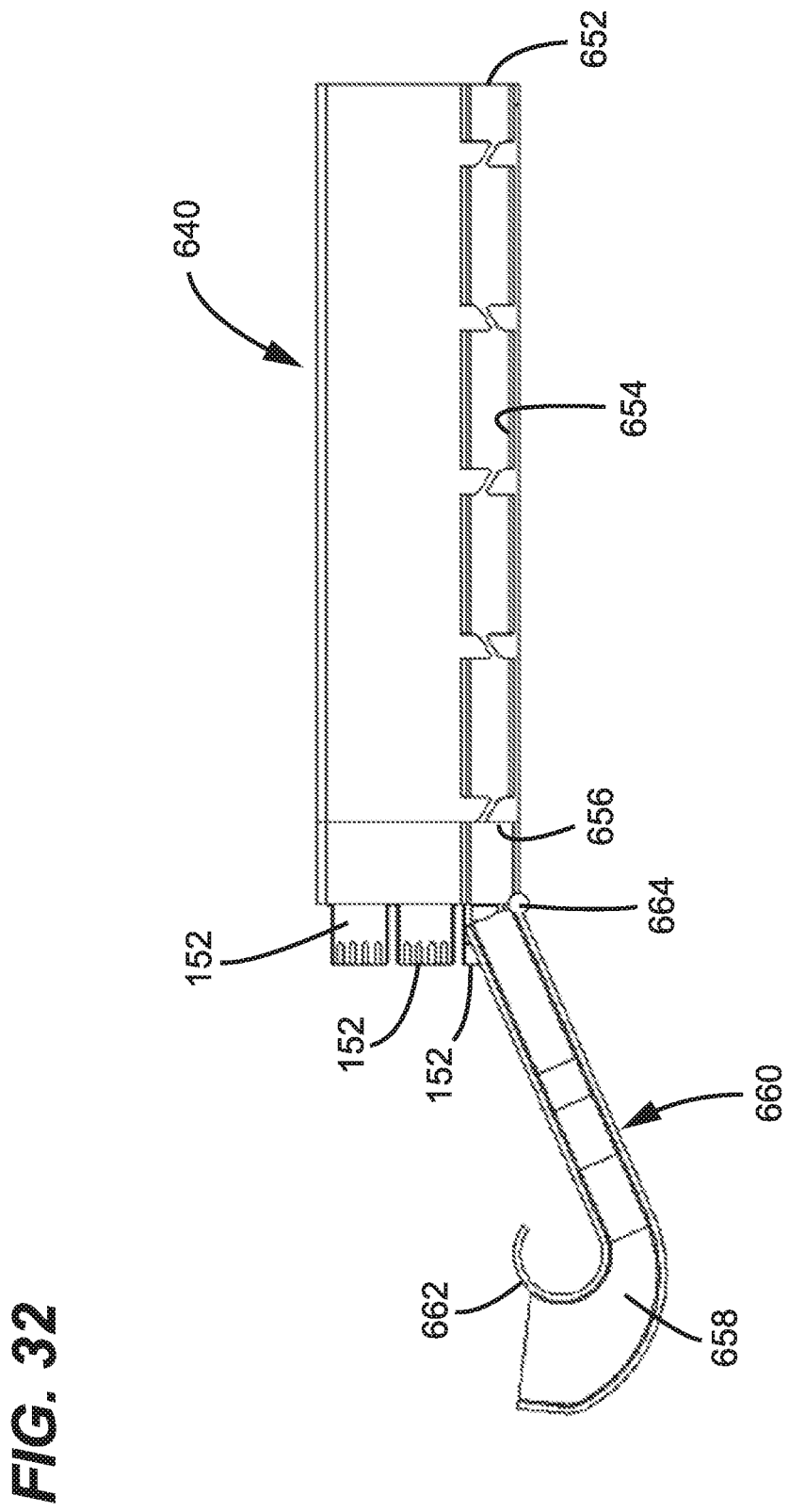
Figure 33:
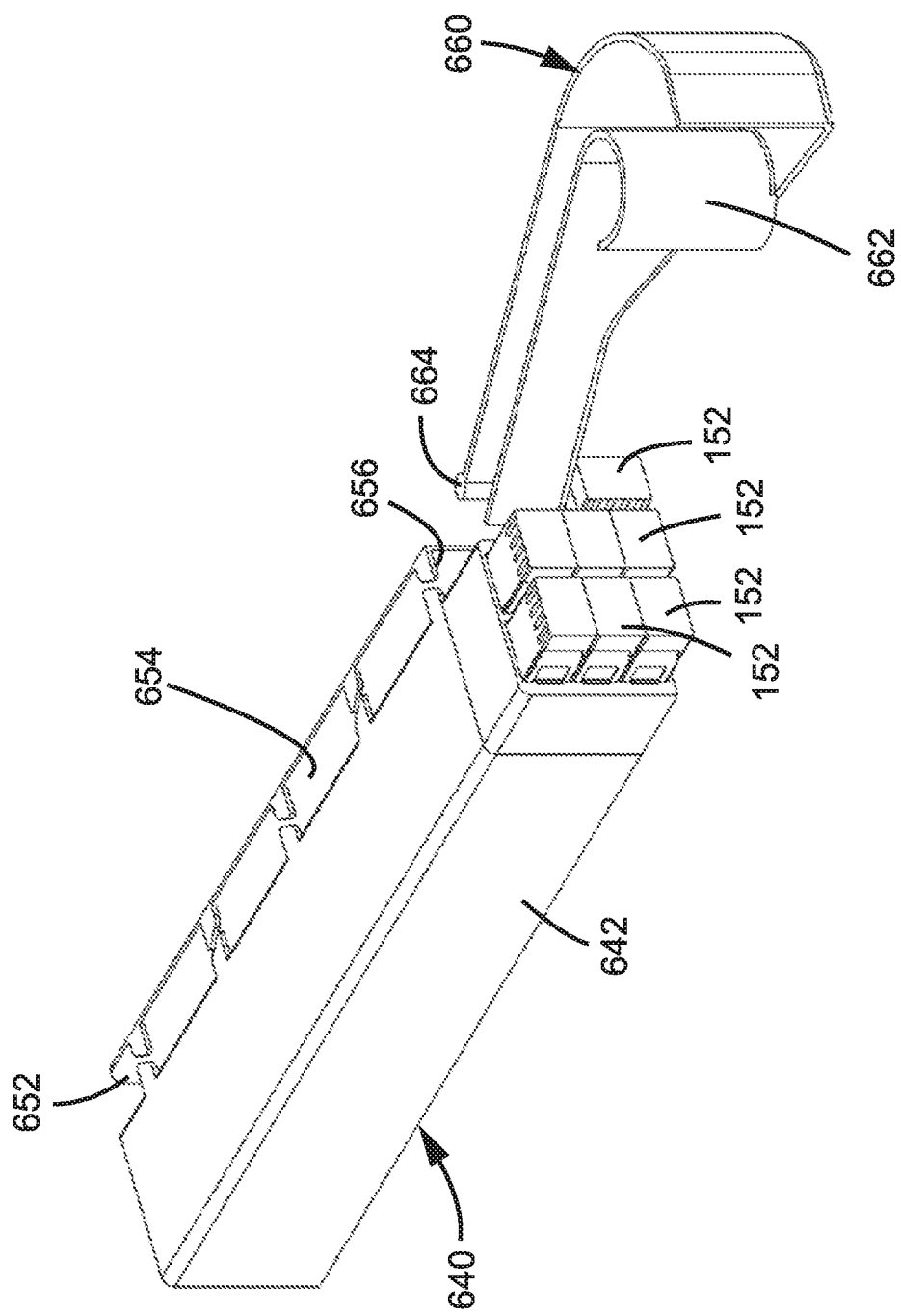

FIG. 10 is a perspective view of a second example panel arrangement configured in accordance with the principles of the present disclosure, the second panel arrangement including an example routing guide;

FIG. 11 is a front elevational view of the second panel arrangement of FIG. 10;

FIG. 12 is a perspective view of a third example panel arrangement configured in accordance with the principles of the present disclosure, the third panel arrangement including a chassis holding more modules than the chassis of the first and second panel arrangements;

FIG. 13 is a front elevational view of the third panel arrangement of FIG. 12;

FIG. 14 is a front, top perspective view of a second example module suitable for use with the third panel arrangement of FIG. 12;

FIG. 15 is a rear, bottom perspective view of the second module of FIG. 14;

FIG. 16 is a rear perspective view of the third panel arrangement of FIG. 12 showing the fastening mechanism for the second modules;

FIG. 17 is a perspective view of a fourth example panel arrangement configured in accordance with the principles of the present disclosure, the fourth panel arrangement including a chassis holding a plurality of modules configured in accordance with the principles of the present disclosure, each module holding optical adapters in at least two different orientations;

FIG. 18 is a front elevational view of the fourth panel arrangement of FIG. 17;

FIG. 19 is a front perspective view of the fourth panel arrangement of FIG. 17 with a top of the chassis removed for ease in viewing internal components of the chassis;

FIG. 20 is a rear perspective view of the fourth panel arrangement of FIG. 19;

FIG. 21 is a first end perspective view of a third module suitable for use with the fourth panel arrangement of FIG. 17;

FIG. 22 is a second end perspective view of the third module of FIG. 21;

FIG. 23 is a perspective view of a fifth example panel arrangement configured in accordance with the principles of the present disclosure, the fifth panel arrangement including an example routing guide;

FIG. 24 is another perspective view of the fifth panel arrangement of FIG. 23;

FIG. 25 is a front elevational view of the fifth panel arrangement of FIG. 23;

FIG. 26 is a perspective view of a sixth example panel arrangement configured in accordance with the principles of the present disclosure, the sixth panel arrangement including a chassis holding a plurality of modules configured in accordance with the principles of the present disclosure, each module holding optical adapters to face a rear interior of the chassis;

FIG. 27 shows a fourth example module exploded from the sixth panel arrangement of FIG. 26;

FIG. 28 is a top plan view of the sixth panel arrangement of FIG. 26 with the top of the chassis removed;

FIG. 29 is a first end perspective view of the fourth module of FIG. 27;

FIG. 30 is a top plan view of the fourth module of FIG. 27 showing the guide trough in a first position;

FIG. 31 is a first end perspective view of the fourth module of FIG. 30;

FIG. 32 is a top plan view of the fourth module of FIG. 27 showing the guide trough in a second, deflected position;

FIG. 33 is a first end perspective view of the fourth module of FIG. 32.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Referring to the figures in general, the present disclosure is directed to an optical module 140, 340, 440, 640 configured to connect an input de-mateable connection interface location to a plurality of output de-mateable connection interface locations. One or more modules 140, 340, 440, 640 may be installed at a chassis 120, 220, 320, 420, 520, 620 to form a panel arrangement 110, 210, 310, 410, 510, 610. In certain implementations, each module 140, 340, 440, 640 may be separately installed and/or removed from the chassis 120, 220, 320, 420, 520, 620.

In certain implementations, a panel arrangement 110, 210, 310, 410, 510, 610 provides 288 output fiber connections within 1 rack unit (RU). In certain examples, the panel arrangement fits on a 19 inch rack. In certain implementations, a panel arrangement 310 provides 384 output fiber connections within 1 RU. In certain implementations, a panel arrangement 110, 210, 310, 410, 510, 610 provides 576 output fiber connections within 2 RU. In certain implementations, two panel arrangements 110, 310 may be mounted in opposite directions to a four bar frame 100 and connected by a trough 170 to provide at least 576 output fiber connections within 1 RU.

In certain implementations, a panel arrangement 110, 210, 310, 410, 510, 610 provides 336 fiber connections (e.g., input fiber connections, output fiber connections, monitoring connections, etc.) within 1 rack unit (RU). In certain implementations, a panel arrangement 310 provides 448 fiber connections within 1 RU. In certain implementations, a panel arrangement 110, 210, 310, 410, 510, 610 provides 672 fiber connections within 2 RU. In certain implementations, two panel arrangements 110, 310 may be mounted in opposite directions and connected by a trough to provide at least 672 fiber connections within 1 RU.

Figure 6:
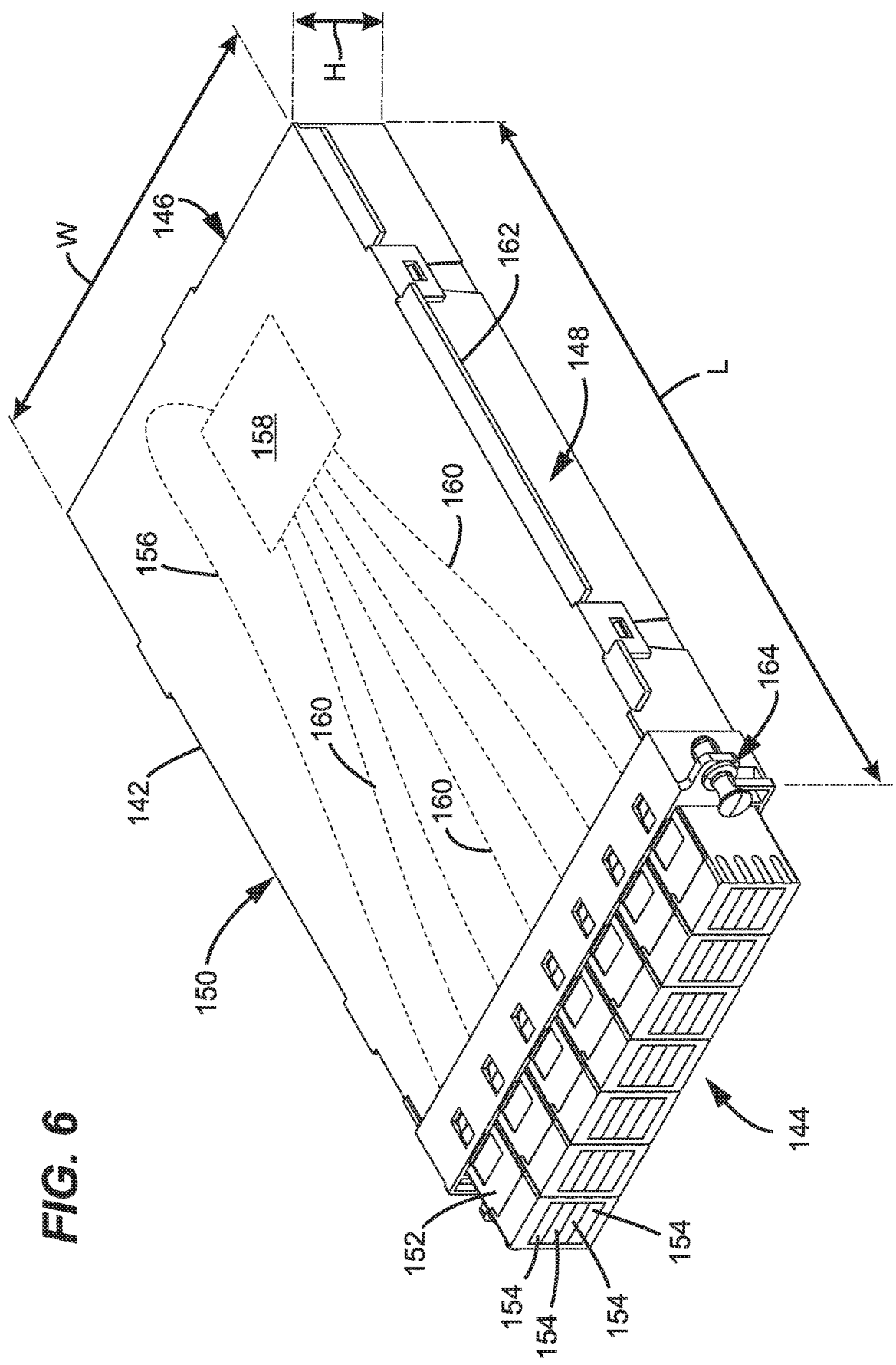
FIG. 6 is a front, top perspective view of the first example module of FIG. 5 with an internal optical circuit shown in dashed lines.

In certain implementations, each optical module 140, 340, 440, 640 includes a wave division multiplexer (WDM) 158 disposed within a body 142, 342, 442, 642 of the module 140, 340, 440, 640 (e.g., see FIG. 6). The WDM 158 is configured to split optical signals received at the input onto the outputs. For example, an input line 156 may extend between the input and the wave division multiplexer 158 and output lines 160 may extend between the WDM 158 and the outputs (e.g., see FIG. 6).

In certain implementations, the de-mateable connection interface locations 154 are defined by optical adapters 152 carried by the modules 140, 340, 440, 640. For the sake of convenience, the connection interface locations 154 are not shown for all adapters 152. It will be understood, however, that each optical adapter 152 defines at least one connection interface location 154. In certain implementations, a module 140, 340, 440, 640 holds at least six optical adapters. In certain implementations, the module 140, 340, 440, 640 hold at least seven optical adapters. In certain implementations, the module 340 hold at least eight optical adapters. In certain examples, a module 140, 340, 440, 640 holds at least one input optical adapter and at least six output optical adapters.

In certain examples, each optical adapter 152 may define multiple de-mateable connection interface locations 154.

Accordingly, each optical adapter 152 may be configured to receive multiple plug connectors. In some examples, the optical adapter 152 defines a separate opening for each de-mateable connection interface location 154. In other examples, the optical adapter 152 defines a common opening leading to the de-mateable connection interface locations 154. In certain implementations, each de-mateable connection interface location 154 provides multiple fiber connections. For example, each de-mateable connection interface location 154 may receive a plug connector terminating multiple fibers.

In certain examples, each optical adapter 152 defines four de-mateable connection interface locations 154. In other examples, however, each optical adapter 152 may define a greater or lesser number (e.g., one, two, three, six, eight, ten, twelve, etc.) of de-mateable connection interface locations 154. In certain examples, each de-mateable connection interface location 154 enables a pair of optical fibers to connect to another pair of optical fibers. In other examples, however, each de-mateable connection interface location 154 enables a greater or lesser number of fibers to connect (e.g., a one-to-one connection, a four-to-four connection, a twelve-to-twelve connection, etc.).

One example optical adapter 152 suitable for use with modules 140, 340, 440, 640 is the SN™ connector adapter offered by SENKO Group of Yokkaichi, Japan. The SN™ connector adapter receives four SN™ plug connectors, which each terminate two optical fibers.

Each module 140, 340, 440, 640 includes a body 142, 342, 442, 642 extending along a length L between a first end 144, 344, 444, 644 and an opposite second end 146, 346, 446, 646. The body 142, 342, 442, 642 also extends along a width W between a first side 148, 348, 448, 648 and an opposite second side 150, 350, 450, 650. The body 142, 342, 442, 642 also has a height H extending transverse to the length L and to the width W. The optical adapters 152 are carried at the first end 144, 344, 444, 644 of the body 142, 342, 442, 642.

In certain implementations, each module 140, 340, 440, 640 defines at least forty-eight de-mateable connection interface locations 154. In certain examples, each module 140, 340, 440, 640 defines at least forty-eight output de-mateable connection interface locations 154. In certain examples, each module 140, 340, 440, 640 defines at least forty-eight output de-mateable connection interface locations 154 and at least one input de-mateable connection interface location 154. In certain implementations, the one or more input de-mateable connection interface locations 154 are provided by a separate adapter from the output de-mateable connection interface locations 154. In certain implementations, each module 140, 340, 440, 640 also defines one or more monitoring de-mateable connection interface locations 154. In certain examples, the one or more monitoring de-mateable connection interface locations 154 are provided by the same optical adapter 152 as the one or more input de-mateable connection interface locations 154.

Figure 1:
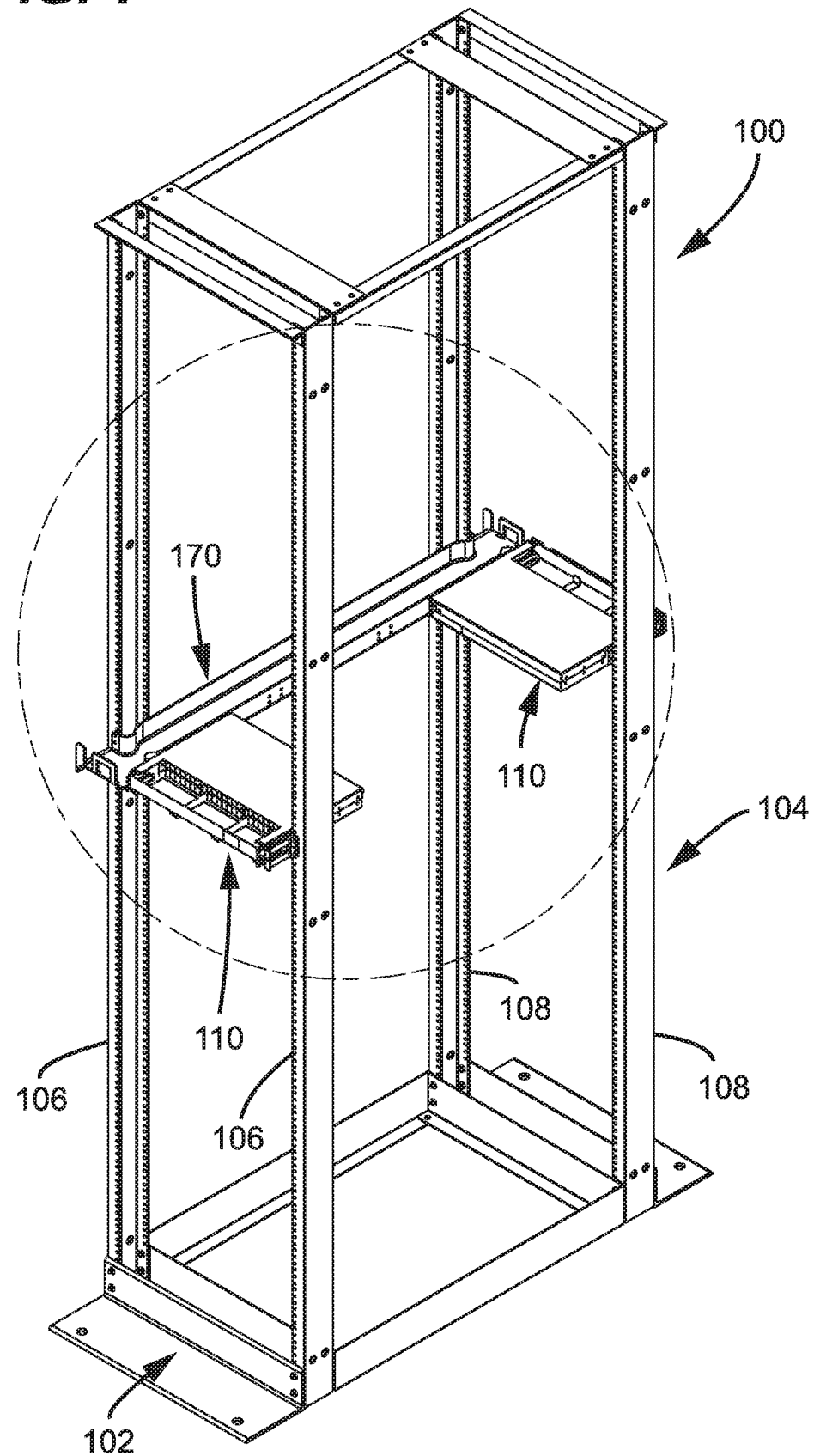
FIG. 1 is perspective view of a first example panel arrangement mounted to a frame and connected to another panel arrangement by a trough, each panel arrangement including a chassis holding a plurality of modules configured in accordance with the principles of the present disclosure, each module holding multiple optical adapters in a row.
Figure 2:
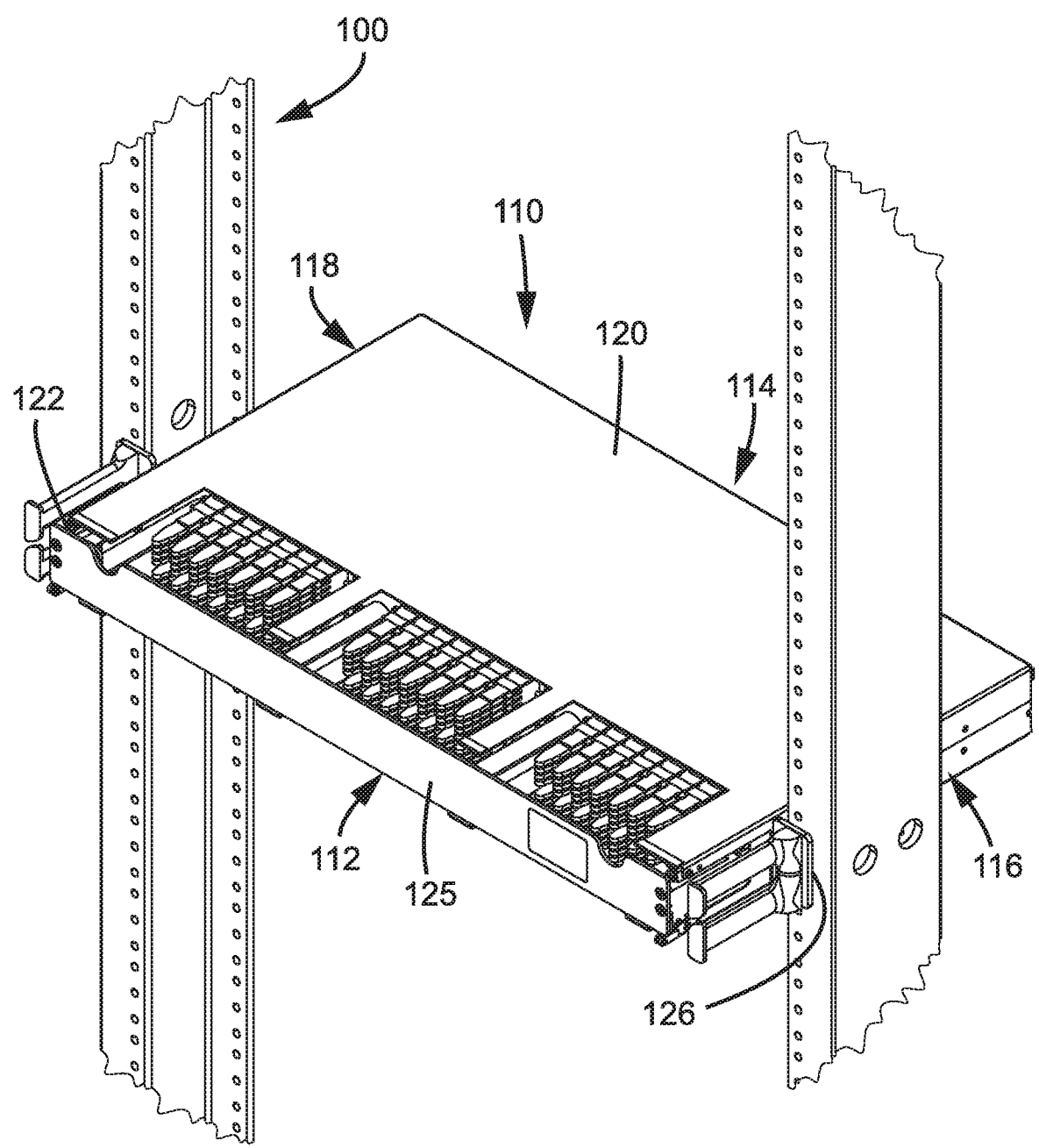
FIG. 2 is an enlarged view of a portion of FIG. 1 showing one of the first panel arrangements.
Figure 3:
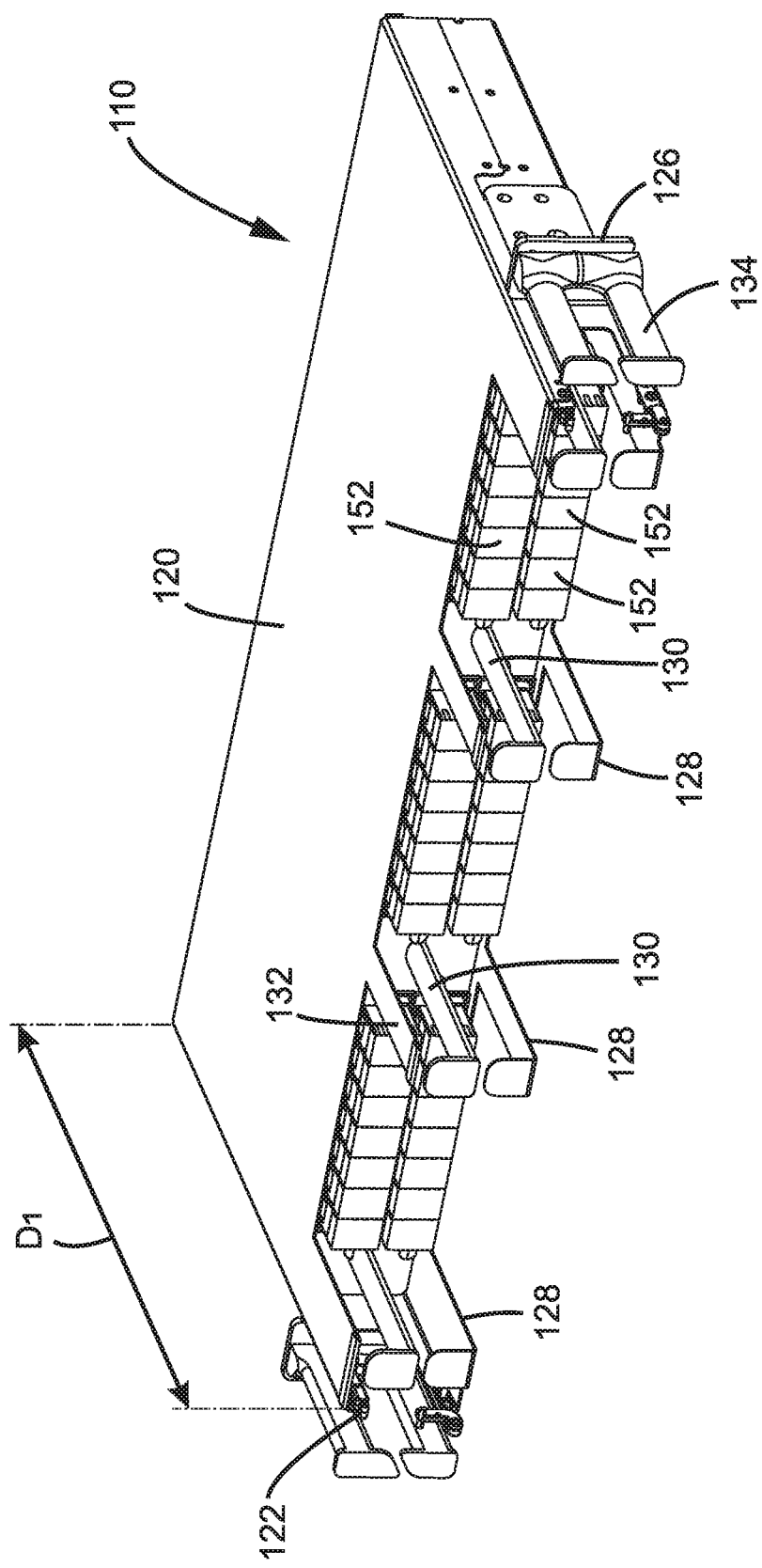
FIG. 3 is a perspective view of the first panel arrangement of FIG. 1 shown separate from the frame.
Figure 4:
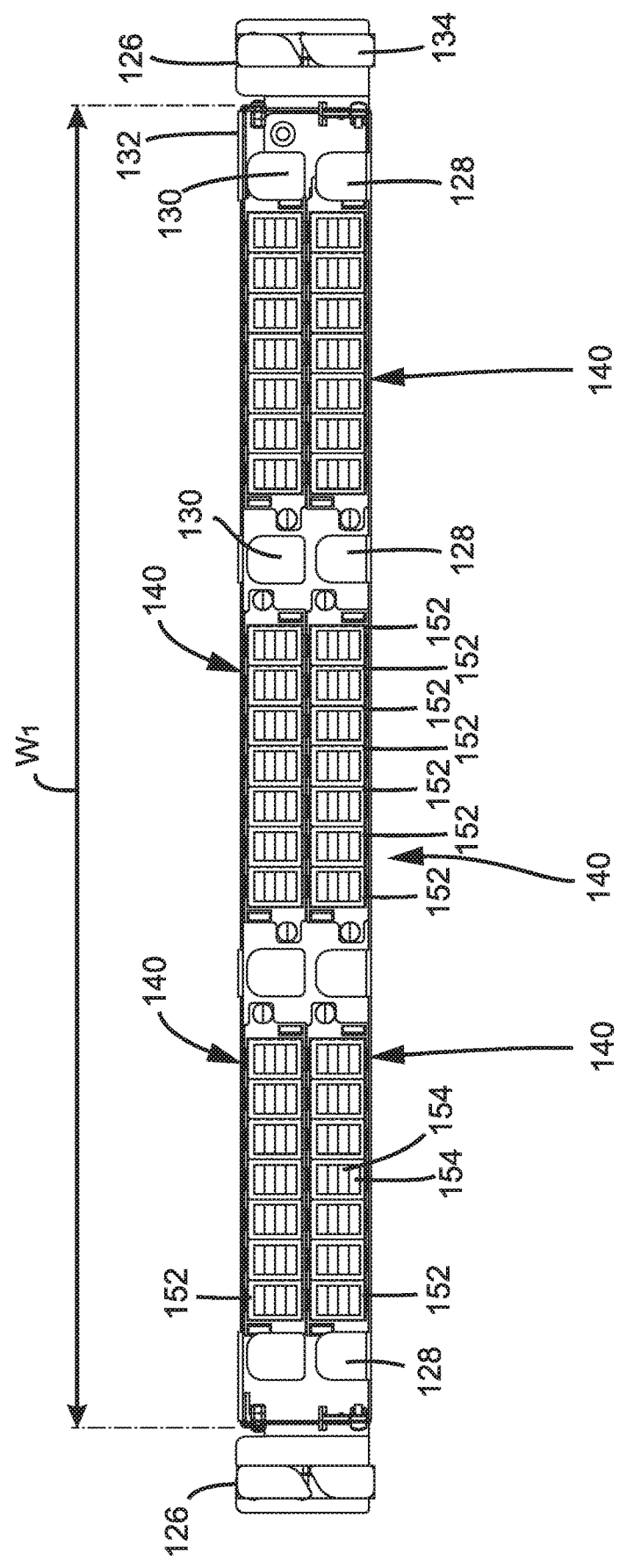
FIG. 4 is a front elevational view of the first panel of FIG. 3.

Referring now to FIG. 1, an example panel arrangement 110 is mounted to an example frame 100. The frame 100 has a first side (e.g., front side) 102 and an opposite second side (e.g., rear side) 104. In some implementations, the frame 100 includes a first set of mounting bars 106 at the first side 102 and a second set of mounting bars 106 at the second side 104. In other implementations, the frame 100 may include a greater or lesser number of mounting bars 106.

One or more panel arrangements 110, 210, 310, 410, 510, 610 may be mounted to the frame 100. For example, the panel arrangements 110, 210, 310, 410, 510, 610 may be mounted to the frame 100 in a vertical column. Each panel arrangements 110, 210, 310, 410, 510, 610 extends across the frame 100 between two of the mounting bars 106.

FIGS. 2-5 illustrate a first example panel arrangement 110 suitable for mounting at the frame 100. The first panel arrangement 110 has a height of 1 RU and a width suitable to mount between a pair of mounting bars 106 of a standard size frame 100. The first panel arrangement 110 has a depth D1 extending between a front 112 and a rear 114. The first panel arrangement 110 also has a width W1 extending between opposite first and second sides 116, 118.

The first panel arrangement 110 includes a chassis 120 secured to the frame 100 using brackets 126. The chassis 120 defines an interior 124 accessible through an open front 122 of the chassis 120. A door 125 can be movably or removably mounted to the chassis 120 to extend across the open front 122. Labeling can be provided on the door 125.

The first panel arrangement 110 includes one or more modules 140 that mount within the interior 124 of the chassis 120. In some implementations, a bulkhead or faceplate may be disposed within the chassis 120. The modules 140 may latch, fasten, slot into, or otherwise couple to the bulkhead or faceplate. In other implementations, other framework may be provided within the chassis 120 to receive the modules 140. In the example shown, the first panel 110 is configured to provide 288 fiber connections within 1 RU. For example, the first panel 110 holds two rows of three modules, each of which includes one input adapter 152 and six output adapters 152. Each output adapter 152 defines four connection interface locations 154 that each receive a connectorized end of two optical fibers. In other examples, however, the first panel 110 may provide a greater or lesser number of fiber connections within 1 RU.

As discussed above, each module 140 carries one or more optical adapters 152 defining a plurality of de-mateable connection interface locations 154 each configured to receive a respective plug connector. The de-mateable connection interface locations 154 are accessible through the open front 122 of the chassis 120. For drawing clarity, the individual de-mateable connection interface locations 154 are not shown in FIG. 3 and are shown only schematically in FIG. 4. It will be understood, however, that each optical adapter 152 can provide one or more de-mateable connection interface locations 154 as discussed above.

The first panel arrangement 110 also can include cable management members extending forwardly of the optical adapters 152. The cable management members define a guide path G (e.g., see FIG. 5) across the open front 122 of the chassis 120 along which cables can be routed from the optical adapters 152 to one or both sides 116, 118 of the first panel 110. For example, the chassis 120 may include one or more support fingers 128 extending forwardly from the bottom of the chassis 120. Each support finger 128 provides a support surface and a retention flange extending upwardly from the support surface. Additional support fingers 130 may extend forwardly from the bulkhead, faceplate, or other framework to which the modules 140 mount. One or more cover members 132 may extend from the chassis 120 to cooperate with the support fingers 130, 128 to guide the cables from the optical adapters 152 to the sides 116, 118 of the first panel arrangement 110. In certain implementations, additional guide members or radius limiters 134 may be disposed at the first and second sides 116, 118 of the first panel 110. For example, the guide members 134 may be coupled to the brackets 126 holding the chassis 120 to the frame 100.

In certain implementations, the optical adapters 152 are arranged in two rows along the width W1 of the first panel 110. In certain examples, the optical adapters 152 within each row are grouped with cable management members disposed between the groups. For example, the support fingers 128, 130 extend outwardly from opposite sides of each group of optical adapters 152 (e.g., see FIG. 4). In certain implementations, each group of optical adapters 152 is separately mountable at the chassis 120.

Figure 5:
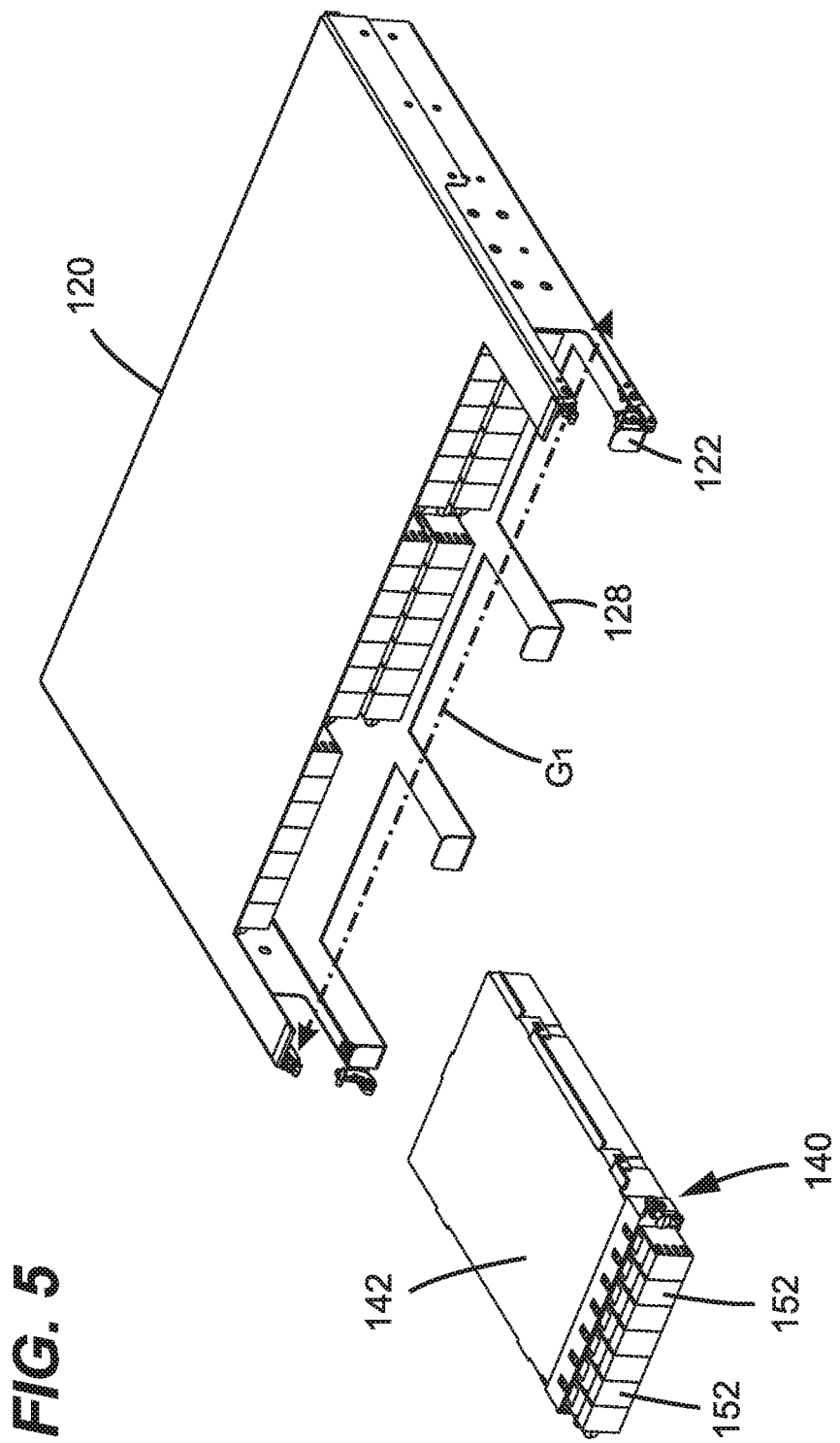
FIG. 5 shows a first example module exploded from the first panel arrangement of FIG. 3.

FIG. 5 shows a first example module 140 exploded outwardly from the chassis 120 of the first panel 110. The first module 140 includes a body 142 carrying the optical adapters 152 in a row. In the example shown, the chassis 120 is configured to receive two layers of modules 140, thereby forming two rows of optical adapters 152 within the chassis 120. In other examples, the chassis 120 and modules 140 may be sized to receive a greater or lesser number of module layers. Each first module 140 provides a group of the optical adapters 152. The cable management members may be disposed between adjacent ones of the modules 140.

Figure 7:
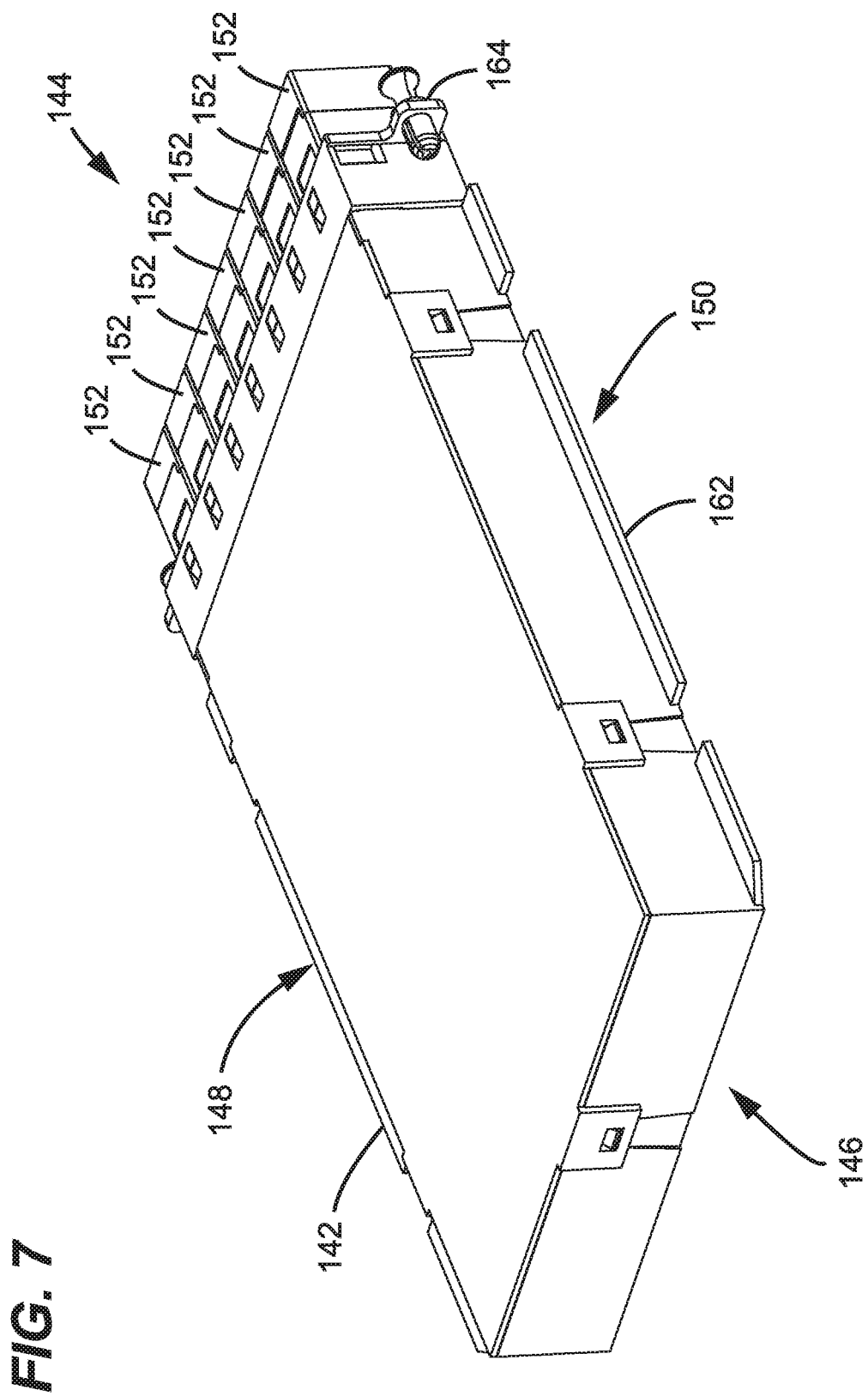
FIG. 7 is a rear, bottom perspective view of the first module of FIG. 6.

FIGS. 6 and 7 provide enlarged views of the first module 140. The first module 140 includes a body 142 carrying multiple optical adapters 152 in a row at a first end 144. In the example shown, the first module 140 carries seven optical adapters 152. In other examples, however, a greater or lesser number of optical adapters 152 may be held. In the example shown, each of the optical adapters 152 defines four de-mateable connection interface locations 154. In other examples, however, a greater or lesser number of de-mateable connection interface locations 154 may be defined. In the example shown, the optical adapters 152 have a common orientation.

The first module 140 is configured to mount within the chassis 120 so that the first end 144 of the module 140 faces outwardly through the open front 122 of the chassis 120. The first module 140 is oriented so that the optical adapters 152 are accessible through the open front 122 of the chassis 120. In some implementations, the body 142 of the first module 140 includes guide rails 162 that slide along channels defined within the chassis 120. For example, the guide rails 162 may extend from opposite sides 148, 150 of the first module body 142. In other implementations, the body 142 may define channels and the chassis 120 may define rails. In still other implementations, the body 142 of the first module 140 may be otherwise supported within the chassis 120.

The first module 140 includes a fastener 164 that secures to a bulkhead, faceplate, or other framework within the chassis 120. In certain examples, the fastener 164 releasably secures the module 140 within the chassis 120. In the example shown, the fastener is a push-pin. In other examples, the fastener may include a screw, a latch, or other such mechanical connection mechanism. In the example shown, both sides 148, 150 of the first module body 142 include a respective fastener 164. In certain examples, the fastener 164 at the first side 148 is offset along the height of the panel 110 from the fastener 164 at the second side 150. Accordingly, the fasteners 164 for adjacent modules 140 may overlap along the height of the panel 110, thereby reducing the space needed along the width of the panel 110 to fit the modules 140.

Figure 8:
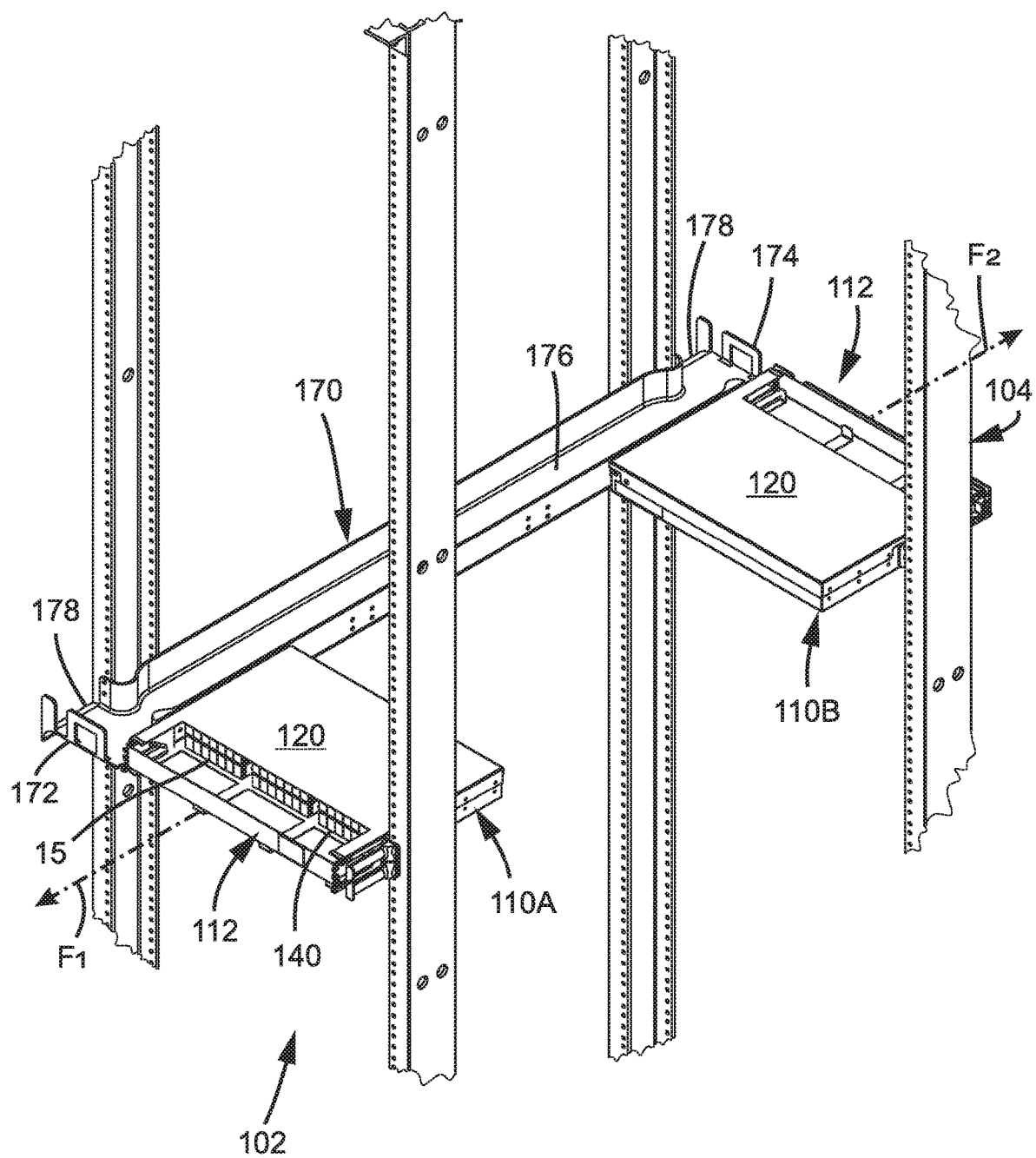
FIG. 8 is an enlarged view of the panel and trough configuration of FIG. 1.
Figure 9:
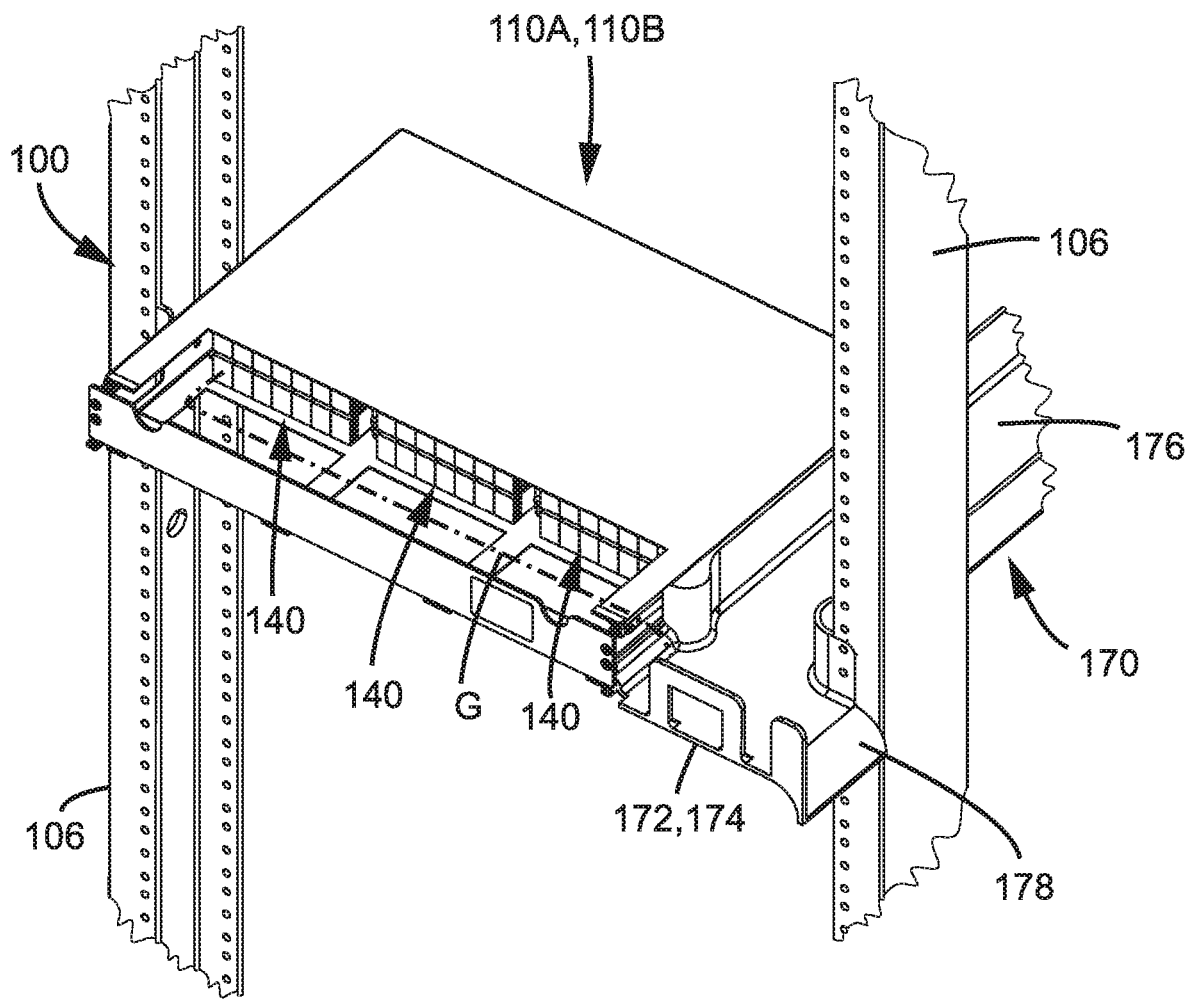
FIG. 9 is an enlarged view of a portion of FIG. 8.

FIGS. 8 and 9 illustrate a panel arrangement configuration including oppositely facing first panels 110 mounted to the frame 100 within 1 RU. The oppositely facing panels 110 are connected by a trough 170 so that optical cables can be routed to both panels 110 from a common side of the frame 100. In the example shown, the illustrated panel arrangement configuration uses two of the first panels 110 to provide 576 output fiber connections within 1 RU. In other examples, a greater or lesser number of output fiber connections can be provided within 1 RU.

One of the first panels (e.g., a front panel) 110A is oriented relative to the frame 100 so that the front end 112 of the first panel 110A faces in a first direction F1. Another of the first panels (e.g., a rear panel) 110B is oriented relative to the frame 100 so that the front end 112 of the second panel 110B faces in a second direction F2 that is opposite the first direction F1. The front and rear panels 110A, 110B are mounted to the frame 100 at a common height so that the panels occupy a common 1 RU of the frame 100. In certain examples, the front panel 110A is identical to the rear panel 110B.

A trough 170 is elongate between opposite first and second ends 172, 174. The trough 170 defines a guide channel 176 extending between the first and second ends 172, 174. At least one of the ends 172, 174 of the trough 170 defines an entrance/exit 178 to the guide channel 176. In the example shown, the trough 170 provides an entrance/exit 178 at each of the first and second ends 172, 174.

The trough 170 extends along a side of the frame 100 so that the first end 172 is disposed at the front panel 110A and the second end 174 is disposed at the rear panel 110B. The trough 170 is disposed between the frame 100 (e.g., a first mounting bar 106) and the second side 118 of the front panel 110A. The trough 170 also is disposed between the frame 100 (e.g., a second mounting bar 106) and the first side of the rear panel 110B. In certain implementations, one side of each panel 110A, 110B mounts directly to the frame 100 and the other side of each panel 110A, 110B mounts to the trough 170, which mounts to the frame 100.

The guide channel 176 of the trough 170 connects the guide path G (e.g., FIG. 5) of the front panel 110A with the guide path G of the rear panel 110B. Accordingly, cables routed to the front panel 110A can be routed from the entrance/exit 178 at the first end 172 of the trough 170, across the guide channel 176, to the guide path G of the front panel 110A. The cables are routed along the guide path G to the optical adapters 152 of the front panel 110A. Cables routed to the rear panel 110B can be routed from the entrance/exit 178 at the first end 172 of the trough 170, along the guide channel 176, to the guide path G of the rear panel 110B. The cables are routed along the guide path G to the optical adapters 152 of the rear panel 110B. In other examples, however, the cables from one or both panels 110A, 110B can be routed to the entrance/exit 178 at the second end 174 of the trough 170.

FIGS. 10 and 11 illustrate a routing guide 180 disposed beneath the modules 140 of a panel 110, 210. The routing guide 180 includes a tray 182 extending along a width W1 of the chassis 120, 220 at the open front 122, 222. The tray 182 provides a routing path extending towards the opposite sides 116, 118 of the panel 110. The routing guide 180 has a height of 1 RU. In some implementations, the routing guide 180 is a separate part from the chassis 120. Accordingly, an end user can choose whether or not to install the routing guide 180 beneath one or more of the first panels 110 on a frame 100. In other implementations, the routing guide 180 is integrally formed with the chassis 220 to form a second panel 210, which has a height of 2 RU. One or more of the second panels 210 can be mounted to a frame 100.

In certain implementations, the routing guide 180 including a lip 184 extending upwardly from the tray 182 at a front of the tray 182. The lip 184 aids in retaining the cables on the tray 182. Additional retention fingers 182 may extend upwardly from the lip 184 to further aid in retaining the cables on the tray 182. One or more fiber management members 188, 190 may extend forwardly of the optical adapters 152 to guide fiber cables received at the optical adapters into the routing guide 180. For example, the fiber management members 188, 190 may guide the cables downwardly from the optical adapters 152 to the tray 182. The fiber management members 188, 190 may include bend radius limiters. The top fiber management members 188 are shaped and oriented to transition the cables received at the optical adapters 152 from routing sideways to routing downward towards the tray 182. The bottom fiber management members 190 are shaped and oriented to transition the cables from routing downward to routing sideways over the tray 182 towards the sides 116, 118 of the panel 110.

FIGS. 12-16 illustrate a third example panel 310 including a chassis 320 configured to mount to the frame 100 using brackets 326. The chassis 320 is sized to receive two rows of four modules 340. Each module 340 includes optical adapters 152 defining de-mateable connection interface locations 154. As shown in FIGS. 14 and 15, the modules 340 are substantially identical to the modules 140, except for the fastening mechanism by which the modules 340 attach to the chassis 320. In the example shown, the third panel 310 is configured to provide 384 fiber connections within 1 RU. For example, the third panel 310 holds two rows of four modules, each of which includes one input adapter and six output adapters. Each output adapter defines four connection interface locations 154 that each receive a connectorized end of two optical fibers. Other configurations may provide a greater or lesser number of fiber connections.

In the first and second panels 110, 210, fasteners 164 extend outwardly into gaps between adjacent modules to fasten to framework within the chassis 120. In the third panel 310, however, the second modules 340 are mounted so close together that no space is available for such a fastener 164 (e.g., see FIG. 13). Rather, a different type of fastener 364 is provided at the second end 346 of the module body 342. The second fastener 364 includes two latch arms 166 that are manually deflectable towards each other. The chassis 320 defines a catch surface 368 at which the latch arms 166 engage to retain the second modules 340 at the chassis 320.

For example, the chassis 320 may define openings through a rear of the chassis 320. In such an example, the rear of the chassis 320 provides the catch surface 368. To insert a second module 340 at the chassis 320, the second module 340 is slid into the chassis 320 through the open front 322 of the chassis 320. As the second module 340 is slid rearward into the chassis 320, the latch arms 366 approach one of the holes at the rear of the chassis. The latch arms 366 are ramped so that the latch arms 366 are squeezed together as the latch arms 366 are pushed through the hole. When pushed sufficiently through the hole, the latch arms 166 deflect away from each other to engage the catch surface 368. To remove one of the second modules 340 from the chassis 320, a user squeezes the latch arms 366 together to clear the catch surface 368 and pushes the latch arms 366 through the hole. The second module 340 can then be pulled from the front of the chassis 320.

FIGS. 17-22 illustrate a fourth panel 410 including a chassis 420 holding one or more modules. The fourth panel 410 has a height H3 of 2 RU. The fourth panel 410 also is configured to hold two rows of modules. The modules 440 received at the chassis 420 of the fourth panel 410 hold the optical adapters 152 in a different pattern than the first and second modules 110, 310. However, the third modules 440 may retain the same type of optical adapters 152 as the first and second modules 140, 340. In the example shown, each third module 440 holds one input optical adapter and six output optical adapters. Accordingly, the fourth panel 410 provides 576 output fiber connections within 2 RU. For drawing clarity, the individual connection interface locations 154 of the optical adapters 152 are now delineated in FIGS. 17 and 19.

The chassis 420 includes support walls 421 disposed within the interior 424 (e.g., see FIGS. 19 and 20). Each module 440 is supported either between two support walls 421 or between a support wall 421 and a sidewall of the chassis 420. In some implementations, each support wall 421 defines one or more channels 423 along which a rail 462 of the module 440 can slide. In other implementations, the support walls 421 otherwise engage the modules 440. In certain implementations, a fastener catch surface 427 can be provided at the front of each support wall 421 to receive a fastener (e.g., a pin or screw) 464 of the module 440.

FIGS. 21-22 illustrate an example third module 440 suitable for use with the fourth panel 410. The third module 440 includes a body 442 extending between opposite first and second ends 444, 446 and between opposite first and second sides 448, 450. The optical adapters 152 are carried at the first end 444. The first end 444 is accessible through the open front 422 of the chassis 420 when the module 440 is mounted within the chassis 420. Dust caps 155 are shown disposed at the de-mateable connection interface locations 154 of the optical adapters 152 in FIG. 21.

In certain implementations, at least one of the optical adapters 152 has a different orientation from another of the optical adapters 152. For example, the input optical adapter may have a different orientation from the output optical adapters. In the example shown, the input optical adapter 152 is rotated 90 degrees relative to the output optical adapters 152.

In certain implementations, at least some of the optical adapters 152 are disposed in one or more columns. In the example shown, the output optical adapters are disposed in columns. In certain implementations, the input optical adapter is disposed adjacent one of the columns. Indicia (e.g., module labeling such as a QR code or barcode) can be provided in a space above the input optical adapter.

In certain implementations, the optical adapters 152 are mounted to a front piece 470 of the body 442. The front piece 470 attaches to a rear piece 472 of the body 442 to enclose the WDM 158 within the body 442. For example, the front piece 470 may latch to the rear piece 472. In certain examples, the rear piece 472 has first and second pieces 474, 476 that latch or otherwise attach together. In certain implementations, the body 442 of the third module 440 is elongate along a length between the first and second ends 444, 446. In certain examples, the rear body 472 forms a majority of the length of the third module 440.

In certain examples, a rail 462 extends along at least one side of the rear piece 472. In the example shown, a first rail 462 extends along the rear piece 472 at the first side 448 of the module 440 and a second rail 462 extends along the rear piece 472 at the second side 450. In certain examples, the first rail 462 is offset along a height from the second rail 462. Accordingly, the corresponding channels 423 can be offset in the support walls 421 of the chassis 420. Offsetting the channels 423 allows the support walls 421 to be made thinner, which facilitates fitting the modules 440 within the width of the chassis 420.

FIGS. 23-25 illustrate the routing guide 180 disposed beneath the modules 440 of a panel 410, 510. The routing guide 180 includes a tray 182 extending along a width of the chassis 420, 520 at the open front 422, 522. The tray 182 provides a routing path extending towards the opposite sides 416, 418 of the panel 410, 510. The routing guide 180 has a height of 1 RU. In certain examples, the routing guide 180 is identical to the routing guide 180 described above with reference to FIGS. 10 and 11.

In some implementations, the routing guide 180 is a separate part from the chassis 420. Accordingly, an end user can choose whether or not to install the routing guide 180 beneath one or more of the first panels 410 on a frame 100. In other implementations, the routing guide 180 is integrally formed with the chassis 520 to form a fifth panel 510, which has a height of 3 RU. One or more of the fifth panels 510 can be mounted to a frame 100.

In certain implementations, one or more fiber management members 188, 190 may extend forwardly of the optical adapters 152 to guide fiber cables received at the optical adapters 152 into the routing guide 180. For example, the fiber management members 188, 190 may guide the cables downwardly from the optical adapters 152 to the tray 182. The fiber management members 188, 190 may include bend radius limiters. The top fiber management members 188 are shaped and oriented to transition the cables received at the optical adapters 152 from routing sideways to routing downward towards the tray 182. The bottom fiber management members 190 are shaped and oriented to transition the cables from routing downward to routing sideways over the tray 182 towards the sides of the panel 410, 510.

FIGS. 26-33 illustrate a sixth panel arrangement 610 suitable for mounting to the frame 100. The sixth panel arrangement 610 provides 576 output fiber connections within 2 RU. The sixth panel arrangement 610 also provides fiber management that facilitates identifying which cables are routed to which modules 640. In certain implementations, the sixth panel arrangement 610 manages slack length of cables routed to the modules 640 to facilitate removal of the modules 640 to enhance access to the optical adapters 152 thereon.

The sixth panel arrangement 610 includes a chassis 620 defining an interior 624 accessible through an open front 622. The chassis 620 has a rear 623 opposite the open front 622. One or more of a fourth type of module 640 can mount within the interior 624 of the chassis 620. Each module 640 is elongate between opposite first and second ends 644, 646. The optical adapters 152 are carried at the first end 644. However, in contrast to the other modules 140, 340, 440 discussed above, the fourth module 640 mounts in the chassis 620 so that the first end 644 faces the rear 623 of the chassis 620. Accordingly, the optical adapters 152 face the rear 623 of the chassis 620 when disposed within the chassis 420 (e.g., see FIG. 28).

The second end 646 of each module 640 is accessible at the open end 622 of the chassis 620 (e.g., see FIG. 26). In certain examples, indicia (e.g., a barcode, a QR code, etc.) may be provided on the second end 646 of the module 640. Since the rear end 646 is a closed end that does not receive any optical adapters, ample space is provided for the indicia. In other implementations, one or more components (e.g., adapters, pigtails, etc.) may be carried at the second end 646.

In some implementations, the optical adapters 152 of the fourth module 640 are arranged in the same configuration as the optical adapters 152 of the third module 440. For example, the input optical adapter of the fourth module 640 may have a different orientation (e.g., be rotated 90 degrees) relative to the output optical adapters. The output optical adapters of the fourth module 640 may be disposed in columns. The input optical adapter of the fourth module 640 may be offset from the output optical adapters.

Each module 640 is configured to receive a group of cables at the second end 646, to route the cables to the first end 644, and to guide the cables to the optical adapters 152 without excessively bending the cables. The route the cables take from the second end 646 to the adapters 152 provides slack length for the cables. This slack length can be utilized to facilitate removal of the modules 640 from the chassis 620 as will be discussed herein.

Each module 640 includes a body 642 defining a passage 654 extending between the first and second ends 644, 646 of the body 642. The passage 654 has an entrance 652 at the first end 644 of the body 642 and an exit 656 at the second end 646 of the body 642. In certain implementations, the passage 654 is accessible along its length from an exterior of the module 640 to enable lateral insertion of cables into the passage 654 (instead of threading the cables therethrough). In certain implementations, the passage 654 is disposed above the input optical adapter 152.

Each module 640 includes a guide trough 660 coupled to the first end 644 of the body 642 in alignment with the exit 656 of the passage 654. The module 640 is configured to mount within the chassis 620 so that the guide trough 660 faces the rear 623 of the chassis 620. The guide trough 660 defines a routing channel 658 leading from the exit 656 of the passage 654, away from the first end 644, and then curving back towards the first end 644 and the optical adapters 152. The guide trough 660 includes a contoured surface 662 that inhibits excessive bending of the optical fibers routed from the guide trough 660 to the optical adapters 152.

In certain implementations, the guide trough 660 is movable relative to the module body 642 between first and second positions. In the first position (FIG. 30), the guide trough 660 routes the cables to the optical adapters 152. In the second position (FIG. 32), the guide trough 660 provides enhanced access to one or more of the optical adapters 152 at the first end 644 of the module body 642. In certain examples, the guide trough 660 pivots (e.g., at a hinge axis 664) between the first and second positions.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. An optical module comprising:
  a body extending along a length between opposite first and second ends and along a width between opposite first and second sides, the body also having a height extending transverse to the length and to the width, the height of the body extending between a top-most surface and a bottom-most surface defined by the body;
  a plurality of optical adapters carried at the first end of the body, the plurality of optical adapters aligned along the width between the first and second sides of the body, each of the optical adapters defining a plurality of de-mateable connection interface locations that are each configured to receive a fiber connector, the de-mateable connection interface locations including one of an input and an output, the optical module further defining a first guide rail extending along the first side of the body between the first and second ends, the optical module further defining a second guide rail extending along the second side of the body between the first and second ends, wherein the first and second guide rails are positioned on opposite sides of the plurality of optical adapters and wherein a top guide surface defined by each of the first and second guide rails is positioned below the top-most surface of the body and a bottom guide surface defined by each of the first and second guide rails is positioned above the bottom-most surface of the body, the optical module further including a catch defined by a fastener of the optical module for removably mounting the optical module to a telecommunications fixture, the catch positioned at only one of the first and second sides of the body, wherein at least a portion of the catch is positioned offset along the height of the body from both the top and bottom guide surfaces defined by the first guide rail and the top and bottom guide surfaces defined by the second guide rail;

an optical component disposed within the body, the optical component configured to process optical signals either received at the input or output at the output; and a cable management structure for guiding cables carrying the optical signals toward and away from either the input or the output, wherein the cable management structure extends from and is pivotally mounted to the body of the optical module such that the cable management is movable relative to the body.

2. The optical module of claim 1, wherein the optical module defines an input by a first of the optical adapters and defines an output by at least one of the other of the optical adapters.

3. The optical module of claim 2, wherein the first optical adapter also defines a monitoring de-mateable connection interface location.

4. The optical module of claim 1, wherein an input of the optical module has a different orientation from an output of the optical module.

5. The optical module of claim 1, wherein the first end of the body defines an indicia location.

6. A panel arrangement mounted to a frame, the panel arrangement comprising:

a chassis defining an interior accessible through an open front;

a plurality of modules that mount within the interior of the chassis, each module carrying a plurality of optical adapters accessible through the open front of the chassis, the optical adapters defining de-mateable connection interface locations each configured to receive a respective fiber connector, the optical adapters of each module defining one of an input de-mateable connection interface location and an output de-mateable connection interface location, each module including an optical component configured to process optical signals either received at the input de-mateable connection interface location or output at the output de-mateable connection interface location, wherein each of the modules mounted within the interior of the chassis defines opposite first and second sides and a height extending between a top-most surface and a bottom-most surface defined by the module, the plurality of optical adapters of the module aligned between the first and second sides, each module further defining a first guide rail extending along the first side for guiding the module within the chassis and a second guide rail extending along the second side for guiding the module within the chassis, wherein the first and second guide rails are positioned on opposite sides of the plurality of optical adapters and wherein a top guide surface defined by each of the first and second guide rails is positioned below the top-most surface of the module and a bottom guide surface defined by each of the first and second guide rails is positioned above the bottom-most surface of the module, each module further including a catch defined by a fastener of the module for removably mounting the module to the chassis, the catch positioned at only one of the first and second sides of the module, wherein at least a portion of the catch is positioned offset along the height of the module from both the top and bottom guide surfaces defined by the first guide rail and the top and bottom guide surfaces defined by the second guide rail, wherein each module also includes a cable management structure for guiding cables carrying the optical signals toward and away from either the input de-mateable connection interface location or the output de-mateable connection interface location, wherein the cable management structure extends from and is pivotally mounted to the module such that the cable management is movable relative to a remainder of the module.

7. The panel arrangement of claim 6, wherein the output de-mateable connection interface locations accommodate at least 288 fiber connections within 1 RU.

8. The panel arrangement of claim 6, wherein the output de-mateable connection interface locations accommodate at least 384 fiber connections within 1 RU.

9. The panel arrangement of claim 6, wherein an input de-mateable connection interface location is rotated 90 degrees relative to an output de-mateable connection interface location.

10. The panel arrangement of claim 6, further comprising:

a routing guide disposed beneath the modules, the routing guide including a tray extending along a width of the chassis at the open front, and the routing guide including a lip extending upwardly from the tray; and a plurality of fiber management members extending forwardly of the optical adapters to guide fiber cables received at the optical adapters into the routing guide.

11. The panel arrangement of claim 10, wherein the routing guide is a separate part from the chassis.

12. The panel arrangement of claim 10, wherein the routing guide is integrally formed with the chassis.

13. The panel arrangement of claim 6, wherein the chassis defines a plurality of catch surfaces configured to receive the fasteners of the modules.

* * * * *